United States Patent [19]
Donelly et al.

[11] Patent Number: 6,002,800
[45] Date of Patent: *Dec. 14, 1999

[54] IMAGE DETECTION SYSTEM

[75] Inventors: Ross Alexander Donelly, West Ryde; Stamatios Demetriou, Beecroft, both of Australia

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,072

[22] Filed: May 16, 1996

[30] Foreign Application Priority Data

May 22, 1995 [AU] Australia ................... PN3100

[51] Int. Cl.[6] ...................... G06K 9/68
[52] U.S. Cl. ............ 382/216; 382/218; 382/295; 382/296; 382/298; 382/135
[58] Field of Search ................... 382/209, 195, 382/218, 294, 295, 296, 297, 298, 216, 217, 135

[56] References Cited

U.S. PATENT DOCUMENTS

| | | | |
|---|---|---|---|
| 3,717,848 | 2/1973 | Irvin et al. | 382/294 |
| 4,736,438 | 4/1988 | Persoon et al. | 382/218 |
| 5,067,162 | 11/1991 | Driscoll, Jr. et al. | 382/126 |
| 5,258,924 | 11/1993 | Call et al. | 382/103 |
| 5,488,672 | 1/1996 | Mita | 382/167 |
| 5,850,466 | 12/1998 | Schott | 382/218 |

FOREIGN PATENT DOCUMENTS

| | | |
|---|---|---|
| 0 191 200 | 8/1986 | European Pat. Off. . |
| 191200A1 | 8/1986 | European Pat. Off. ......... G06K 9/80 |
| 0 218 259 | 4/1987 | European Pat. Off. . |
| 0 294 497 | 12/1988 | European Pat. Off. . |
| 0 448 956 | 10/1991 | European Pat. Off. . |
| 448956A2 | 10/1991 | European Pat. Off. .......... G01S 7/00 |
| 2637144 | 3/1990 | France ............................. H04N 3/10 |
| 2 029 958 | 3/1980 | United Kingdom . |
| 2029958A | 3/1980 | United Kingdom ........... G01N 21/00 |

OTHER PUBLICATIONS

"The Visual Classification Of Magazines", by A.M. Wallace et al., Pattern Recognition Letters, vol. 9, No. 4, May 1989, pp. 297–301.

*Primary Examiner*—Jon Chang
*Attorney, Agent, or Firm*—Fitzpatrick, Cella, Harper & Scinto

[57] ABSTRACT

An image detection system is disclosed for the detection of an image in an input pixel stream. An image is input as a input pixel stream and accumulated and converted into cells which are formed into cell data portions from regions of a corresponding image of the input pixel stream. A template storage ROM stores at least one template that comprises a multiplicity of cell data entries derived form an desired image to be detected. A comparator matrix is connected to the cell converter and the template ROM for comparing the cell data portions with a multiplicity of cell data entries to derive a template detection signal when a predetermined number of the cell data portions match with the multiplicity of said cell data entries. The system finds particular use in the prevention of fraudulent copying of images, such as bank notes using colour laser copiers and printers.

38 Claims, 34 Drawing Sheets

Original 90-degree rotation 270-degree rotation 180-degree rotation

A row of 128 x 128 averages can be calculated for 4 phases by adding averages from 3 rows of 64 x 64 averages.

IMAGE DETECTION SYSTEM

FIELD OF THE INVENTION

The present invention relates to detecting input image characteristics in a stream of pixel data and has particular application in the detection of bank notes or the like so as to prevent forgeries or copies thereof being made.

BACKGROUND ART

In recent years, the availability and quality of colour reproduction systems, such as colour laser copiers, coloured ink jet printers and colour offset printers has increased dramatically. As a result of these increases in availability and quality, the incidence of forgeries being produced on such devices has also increased dramatically. Obviously, an increased incidence of forgeries is of great concern to the general fabric of society. Social concerns have risen to such an extent that the relevant authorities of various governments have seriously considered restricting or banning the use of these devices because of concerns over the increased levels of forgery.

These is therefore a general need for an inexpensive form of device that can detect when a document of value is being copied or printed and be able to disable the printing device so as to discourage its use in the production of forgeries.

SUMMARY OF THE INVENTION

It is an object of the present invention to provide a means for detecting the presence of certain images in an input stream of pixels with the consequential side-effect that the incidence of forgeries can be lessened.

In accordance with a first aspect of the present invention there is provided apparatus for the detection of an image in an input pixel stream, said apparatus comprising:
(i) image input means for receiving said input pixel stream;
(ii) cell converter means for forming cell data portions from regions of a corresponding image of said input pixel stream;
(iii) template storage means for storing at least one template, said template comprising a multiplicity of cell data entries derived form the desired image to be detected; and
(iv) comparator means for comparing said cell data portions of said cell converter means with said multiplicity of cell data entries to derive a template detection signal when a predetermined number of said cell data portions match with said multiplicity of said cell data entries.

In accordance with a second aspect of the present invention there is provided apparatus for the detection of an image in an input pixel stream, said apparatus comprising:
(i) image input means for receiving said input pixel stream;
(ii) template storage means for storing at least one template, said template comprising a multiplicity of cell data entries derived from a desired image to be detected; and
(iii) template storage means for storing at least one template, said template comprising a multiplicity of cell data entries derived from a desired image to be detected; and
(iv) comparator means for comparing said cell data of each of said series of phases of said cell converter means with said multiplicity of cell data entries to derive a template detection signal when a predetermined number of said cell data portions match with said multiplicity of said cell data entries.

In accordance with a third aspect of the present invention there is provided apparatus for comparing a first predetermined array of cell data values with a second predetermined array of template data values, said apparatus comprising:
(i) input means for inputting, a column at a time, said first predetermined array of cell data values to a comparator matrix means;
(ii) a comparator matrix means for simultaneously determining if said column of cell data values matches with any of a plurality of columns of said second predetermined array of template data values and to produce a column matching signal designating the said matched column of said second predetermined array of template data values;
(iii) tally array means for storing said column matching signals for a series of columns of said first predetermined array of cell data values, and
(iv) template match detection means for deriving from said stored column matching signals, a template match signal signifying the occurrence of a match between said template and a portion of said first predetermined array of cell data values.

In accordance with a fourth aspect of the present invention there is disclosed an image processing method comprising the steps of:
inputting image data representing an input image;
determining whether the input image includes a first pattern extracted from a first region of a specific image and generating a first determination result;
determining whether the input image includes a second pattern extracted from in a second region of the specific image and generating a second termination result; and
discriminating whether the input image includes the specific image based on the first and second determination results and positional information about the first and second regions.

In accordance with a fifth aspect of the present invention there is disclosed an image processing method comprising the steps of:
inputting image data representing an input image;
extracting multi-value data for each of a plurality of cells corresponding to a region of the input image; and
discriminating whether the input image includes a specific image by comparing the extracted multi-value data with multi-value template data for each of a plurality of cells corresponding to a region of the specific image.

In accordance with a sixth aspect of the present invention there is disclosed an image processing method comprising the steps of:
inputting image data representing an input image;
extracting cell data for each of a plurality of cells corresponding to a first region of the input image; and
discriminating whether the input image includes a specific image by comparing the extracted cell data with template data for each of a plurality of cells corresponding to a second region of the specific image;
wherein the discrimination is performed by compensating a minute aberration between the first region of the input image and the second region of the specific image.

BRIEF DESCRIPTION OF THE DRAWINGS

A preferred embodiment of the present invention will now be described with reference to the accompanying drawings in which.

DETAILED DESCRIPTION

Figure 1:
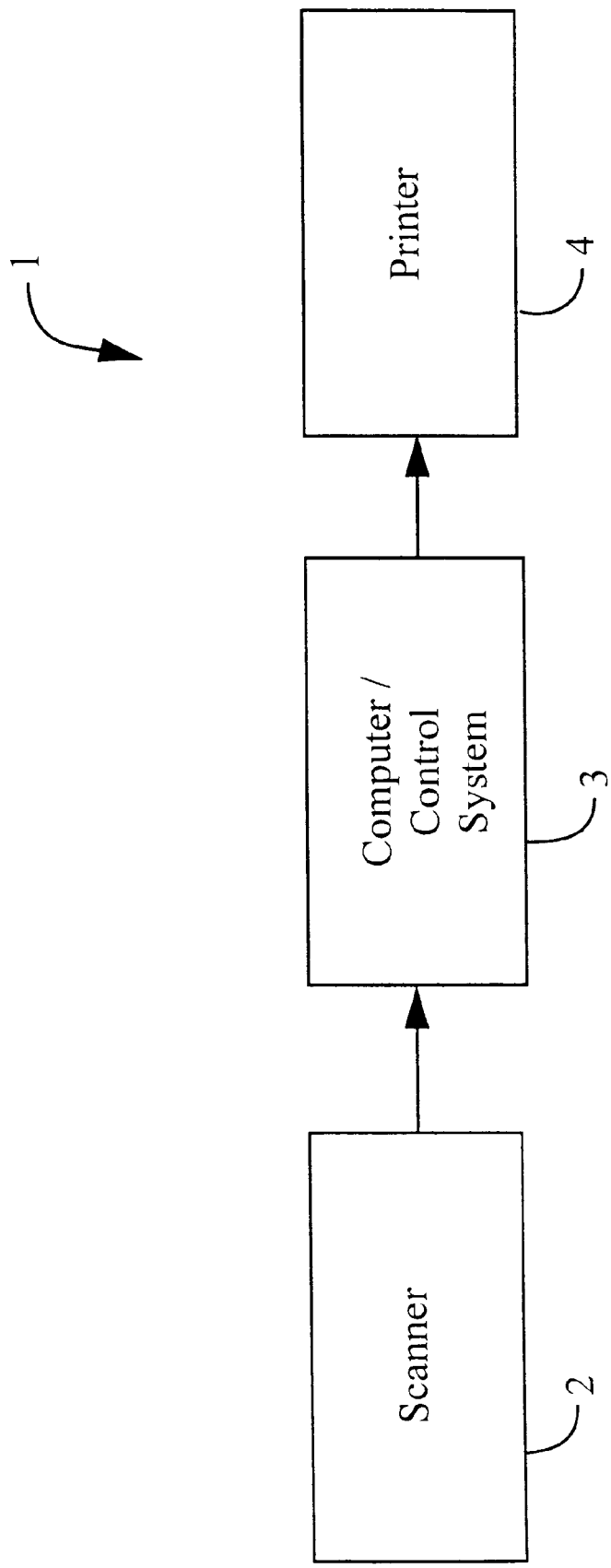
FIG. 1 illustrates a colour copier system of the preferred embodiment.

The preferred embodiment of the present invention is described with reference to an arrangement configured for incorporation in a colour laser copier system 1, such as the Canon Colour Laser Copier sold by Canon Inc. of Japan. Further, the preferred embodiment can be readily applied to colour printers such as Models P320 and P330 also sold by Canon Inc. Referring now to FIG. 1, such a colour copier system consists of a scanner 2, capable of scanning an input image to a very high resolution, for example 600 dots per inch (dpi). The scanned image can be fed, on a pixel by pixel basis, to a computer and control system 3 which is able to manipulate the scanned image, for example by providing scaling or transforming functions. The resultant pixel image is then fed to a printer 4, again on a pixel-by-pixel basis, where it is printed on a medium, such as paper. The scanned image from scanner 2, normally consists of separate colour channel information for each of red, green and blue (RGB) colour portions of the scanned image, which is commonly known as an additive colour format. The printer 4 generally prints out the scanned image by means of a four pass subtractive colour process. The four pass printing process normally consists of separate passes for the Cyan, Magenta, Yellow and Black (CMYK) portions of the scanned image. As the printer 4 operates on a four pass process, the image on scanner 2 is also normally scanned once to obtain the RGB colour portions which are subsequently converted to one of the Cyan, Magenta, Yellow and Black portions as required.

Figure 2:
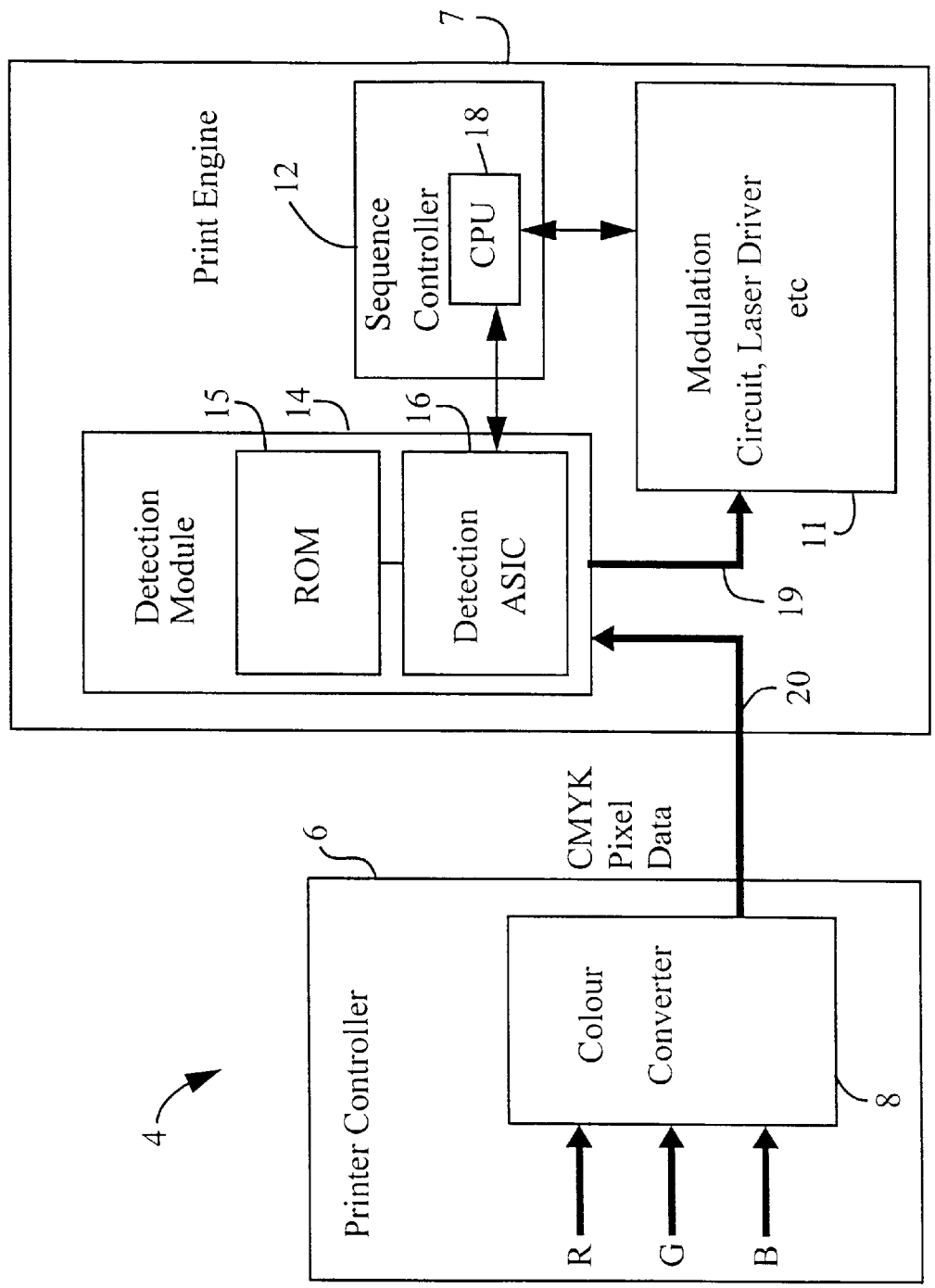
FIG. 2 illustrates the printer of FIG. 1 in more detail.

As shown in FIG. 2, the printer 4 consists of a printer controller 6 and a print engine 7. The printer controller 6 includes a colour converter 8, which takes as inputs the additive colour components, Red, Green, Blue (RGB) and derives the required subtractive colour component (CYM or K) for the require pass of the printer 4. The subtractive colour components (MCYK) are supplied to the printer 4 frame-sequentially. The colour converter 8 can be implemented by a number of different methods, known to those skilled in the art, the actual method used not being relevant for the purposes of the present description.

The print engine 7 includes a modulation circuit and laser driver 11 for creation of the required image on an electrostatic drum for subsequent transfer to paper or other print medium. A sequence controller 12, including an internal central processing unit (CPU) 18, is responsible for the overall operation of the print engine 7. Additionally, there is provided a detection module 14 which is preferably placed in, or alternatively arranged to monitor, the pixel stream 20 output from colour converter 8 to the modulation circuit 11. The detection module 14 is configured to monitor the pixel stream 20 to detect an attempt to print out an image of a bank note or the like and to "blank out" pixel data on an output 19 of the detection module 14 when such an attempt is detected. The detection module 14 is designed to detect a number of different possible bank notes or other possible candidates for unwanted duplication and includes a read-only-memory (ROM) 15 for storing template information derived from the different image candidates. The template ROM 15 interacts with a detection application specific integrated circuit (ASIC) 16 which performs all the control operations of detection module 14.

Referring again to FIG. 1, the scanner 2 of a colour laser copier such as Canon's P320 forms a pixel stream of data on a line by line basis with approximately 7,232 pixels per line and 11,456 lines per scanned page. This pixel stream is normally generated at a rate in the vicinity of 22.5 million pixels per second.

Figure 3:
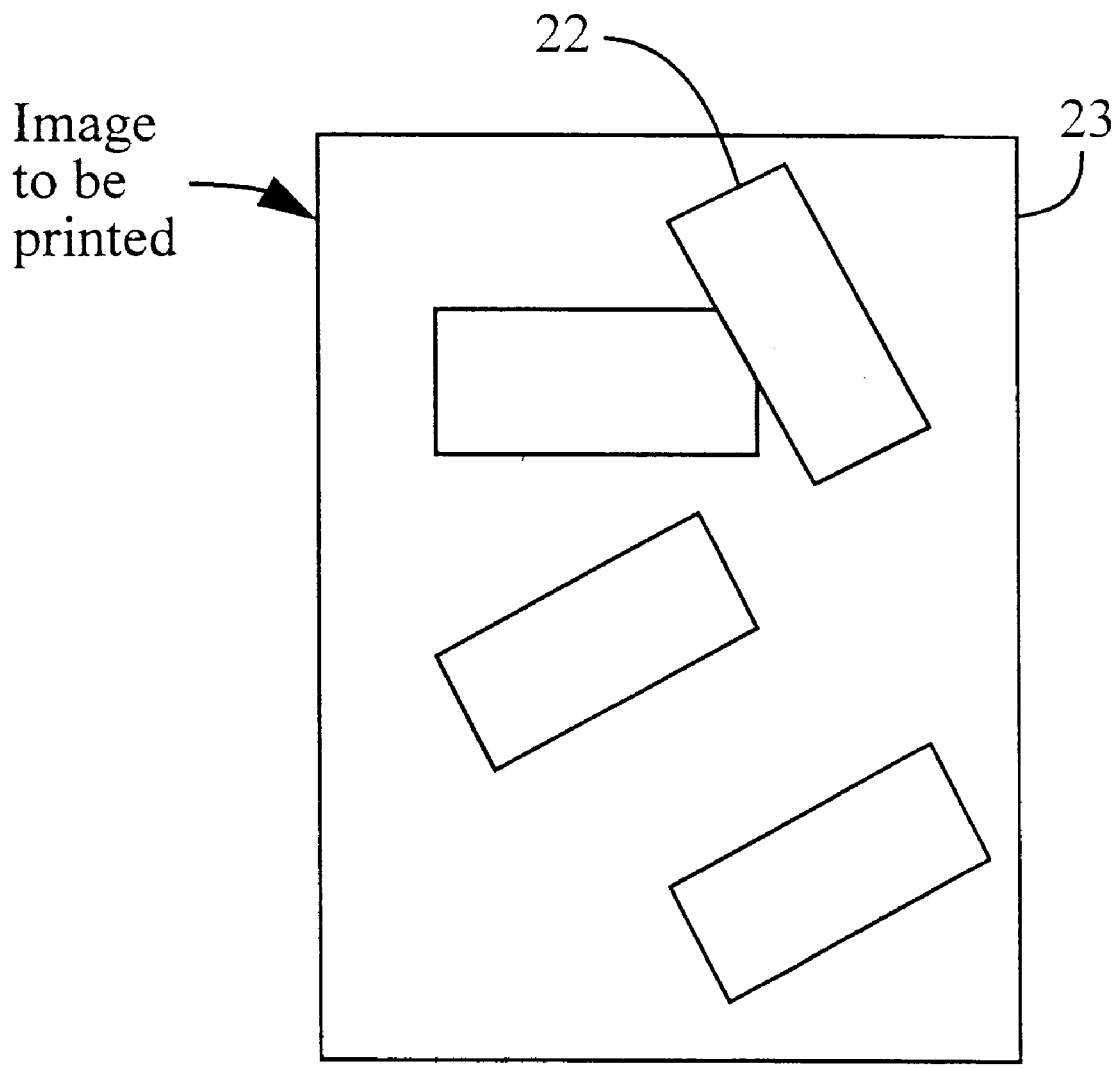
FIG. 3 illustrates a number of different possible orientations of an image to be detected in an output image.

Turning now to FIG. 3, there is illustrated schematically a scanned image 23. This scanned image has a number of bank (monetary) notes placed at various orientations and rotations which are required to be detected by the detection module 14 of FIG. 2. Hence, the detection module 14 is designed to detect a number (one or more) of different bank notes 22 at different possible positions or rotations in the scanned image, in addition to detecting enlarged or reduced bank notes in the range of approximately 95%–105% of the input image size. The detection module 14, is designed to detect bank notes by means of comparison of the pixel stream with a "template" stored in the ROM 15 so as to detect the occurrence of the template within the pixel stream.

Figure 4:
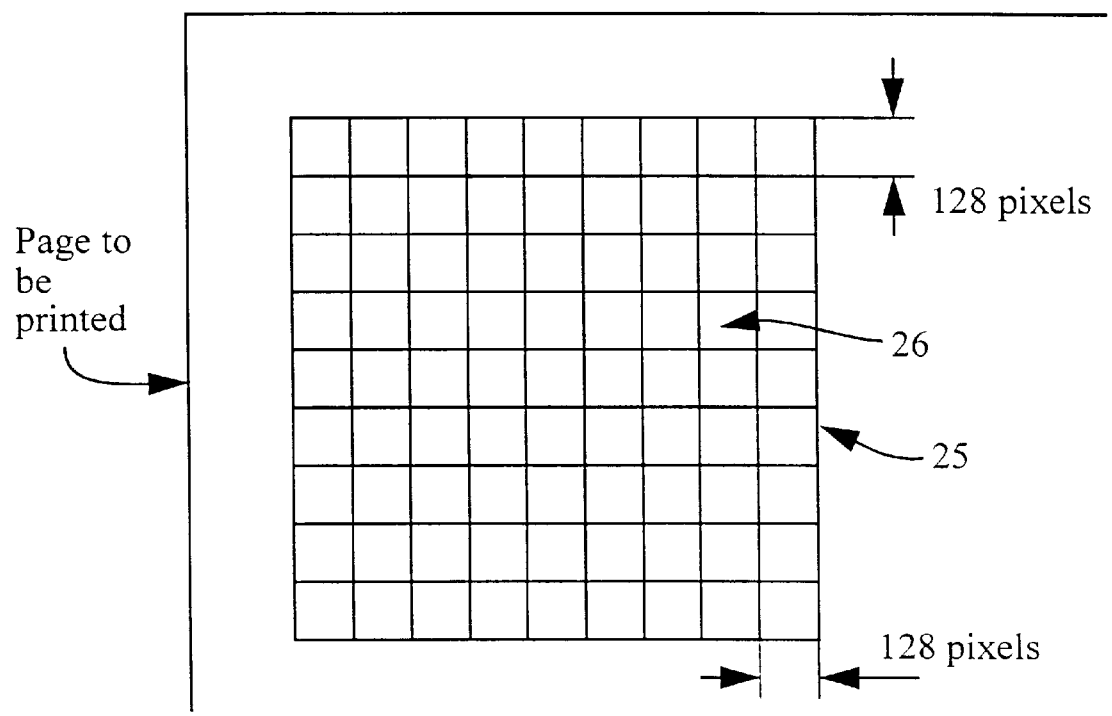
FIG. 4 illustrates the template structure utilised by the preferred embodiment.

Referring now to FIG. 4, there is shown a template 25 which consists of a 9×9 array of cells 26. Each cell 26 is designed to be compared with a block of 128×128 pixels. As will further be described hereinafter, each cell 26 contains information about the colour or brightness of the corresponding block of pixels which should be present at that portion of the image.

Figure 5:
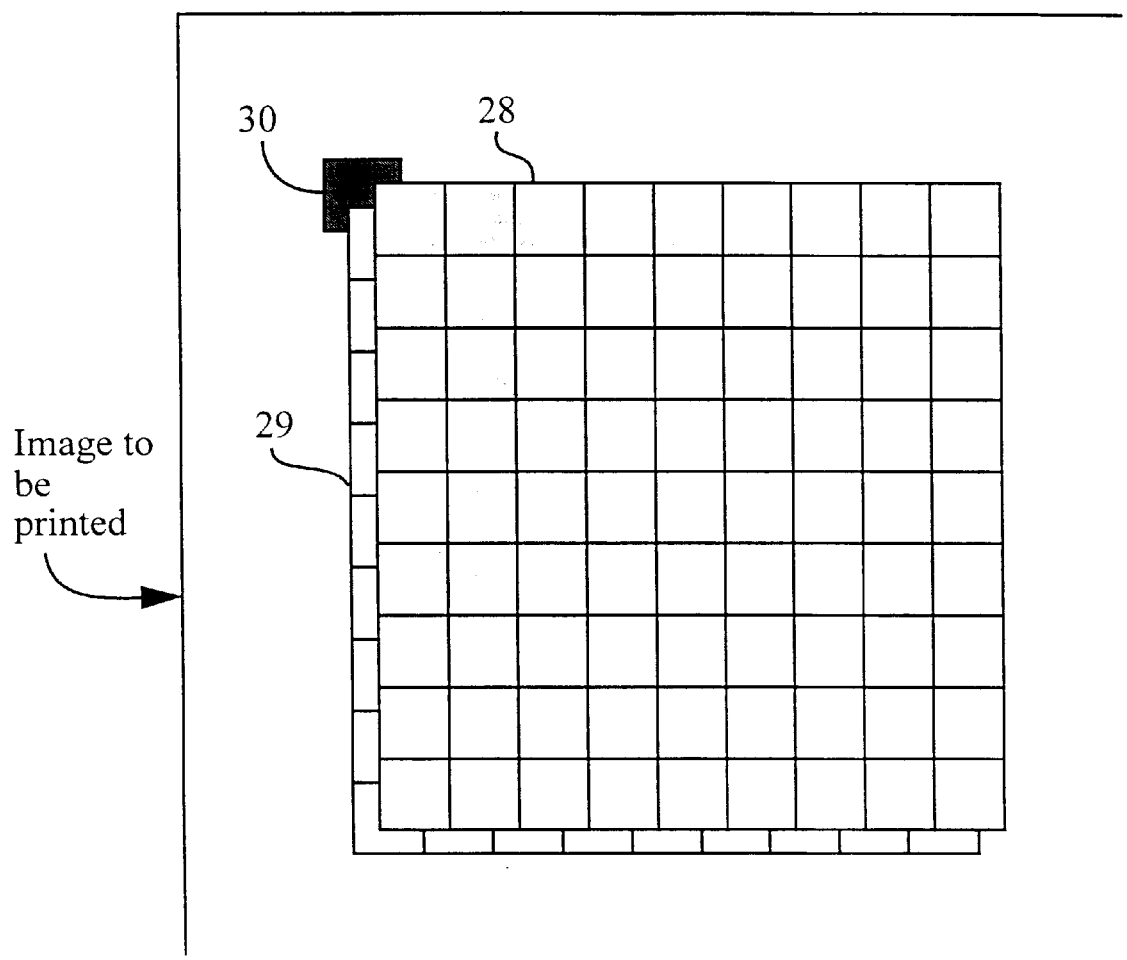
FIG. 5 illustrates the grouping together of templates.

It is necessary for the detection module 14 to detect bank notes at all possible rotations and positions. As the number of possible rotations and positions is extremely large, it is unrealistic to store a template for each possible rotation or position. However, if each cell contains a range of information about the colour and brightness at that position of the bank note, it is not necessary to store all possible orientations. The average colour and brightness of the block of pixels corresponding to a single cell remains substantially the same in value for template orientations which are very near in position and/or rotation to an initial template. Therefore, template orientations which are very near in position and rotation can be grouped together so that only one template comparison operation is needed for each group. In FIG. 5, there is shown an example of two templates 28, 29 having the same rotations but slightly different alignments. The two template 28, 29 are said to be in the same group if their top left hand corners lie within a group area 30. Therefore, all corresponding translations of template 28 whose top left corner lies within the group area 30 are also considered to be in the same group. Additionally, all rotated templates whose rotation is less than 6.4 degrees and whose top left hand corner also lies in group area 30 are also considered to be within the same group. The use of the group area 30 substantially reduces the number of required comparisons to be performed by the detection module 14 to a reasonable level. The smaller the group area size 30, the more likely that a translated or rotated template within the same group is likely to produce similar cell values. For the purposes of the preferred embodiment, it was found that a group area 30 which is one quarter the area of one cell 26 (FIG. 4) was suitable.

Consider initially the simple case of detecting a template in an image without any rotation. In order to accomplish this task, the scanned page is divided into group areas and a template comparison is carried out for each group area. As mentioned above, the selected cell area is four times the group area. Therefore, to search for a template, a comparison is initially made for the group area at the top left hand corner of the scanned image page. Next, a comparison is made against the group area offset half a cell to the right of the top left hand corner, then half a cell down from the top left hand corner, then half a cell down and to the right of the top left hand corner. Once all these comparisons have been made, the equivalent of a whole cell has been covered and the process can move to the next cell position to perform the same comparisons.

Figure 6:
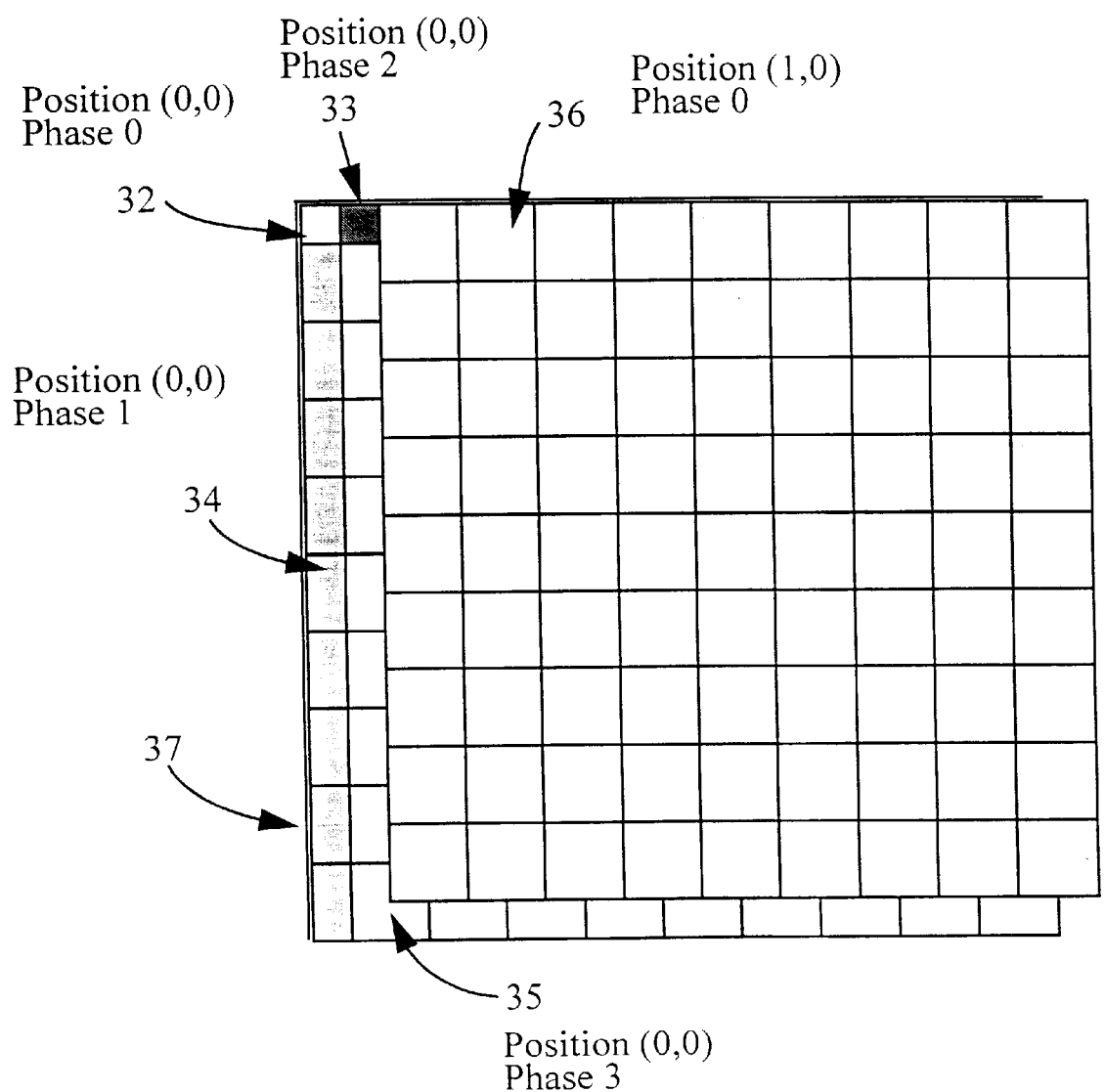
FIG. 6 illustrates the phase relationship of templates utilised in the preferred embodiment.
Figure 7A:
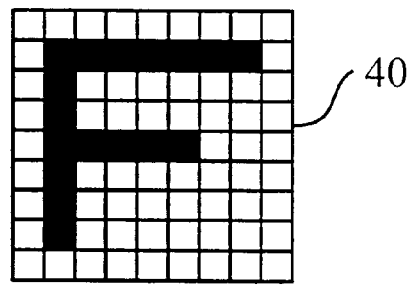
FIGS. 7A to 7D illustrates the process of rotation of a template.
Figure 7B:
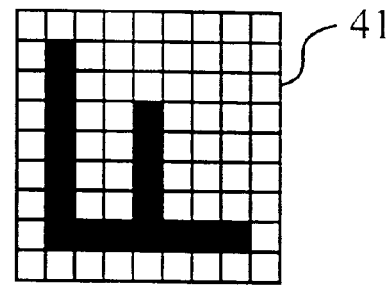
Figure 7D:
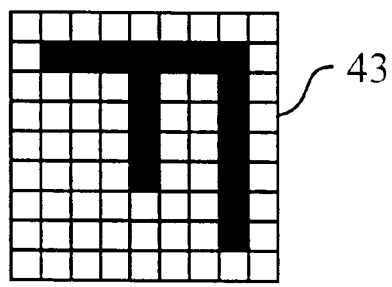
Figure 7C:
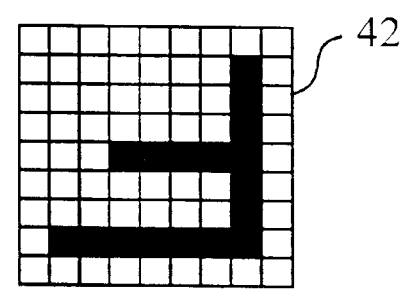

Turning now to FIG. 6, there is shown an example of this process. Five templates 32–36 are shown superimposed on top of one another. Template 32, as the bottom-most template, has only a small portion of its top left hand corner visible and is in the top left hand corner of the image to be printed 37 and is designated to be at position (0,0), phase 0. Template 33, the second bottom template, is offset half a cell distance to the right of template 32 and is designated to be at position (0,0), phase 2. Template 34 is positioned half a cell below template 32 and is designated to be in position (0,0), phase 1. Template 35 is positioned half a cell below template 33 and is designated to be in a position (0,0), phase 3. Template 36, being shown as the topmost template is designated to be in a position (1,0), phase 0.

The four templates 32–35 have corresponding group areas which cover the cell of the top left hand corner. In the preferred embodiment there are four phases per cell position. Of course, the number of phases per cell is dependent on the ratio between the cell area and the group area. If the group area was chosen to be a ninth of the cell area, nine phases would be required. As will be seen hereinafter, this would increase the computation requirements necessary in the detection module 14.

Consider now the case of rotation. A separate template of a portion of the bank note is stored for every 6.4° of rotation. This is equivalent to fourteen templates being stored in the ROM 15 (FIG. 2) for 90° of rotation. It is only necessary to store the first 90° of rotation as the other rotations (up to 360°) can be easily obtained from the original by swapping the template cells around by multiples of 90°. Referring now to FIGS. 7A to 7D, there is shown an original template 40 and rotated templates 41, 42, 43 which can be derived from the original template 40 by rotation through the simple remapping of cell address index values.

Figure 8:
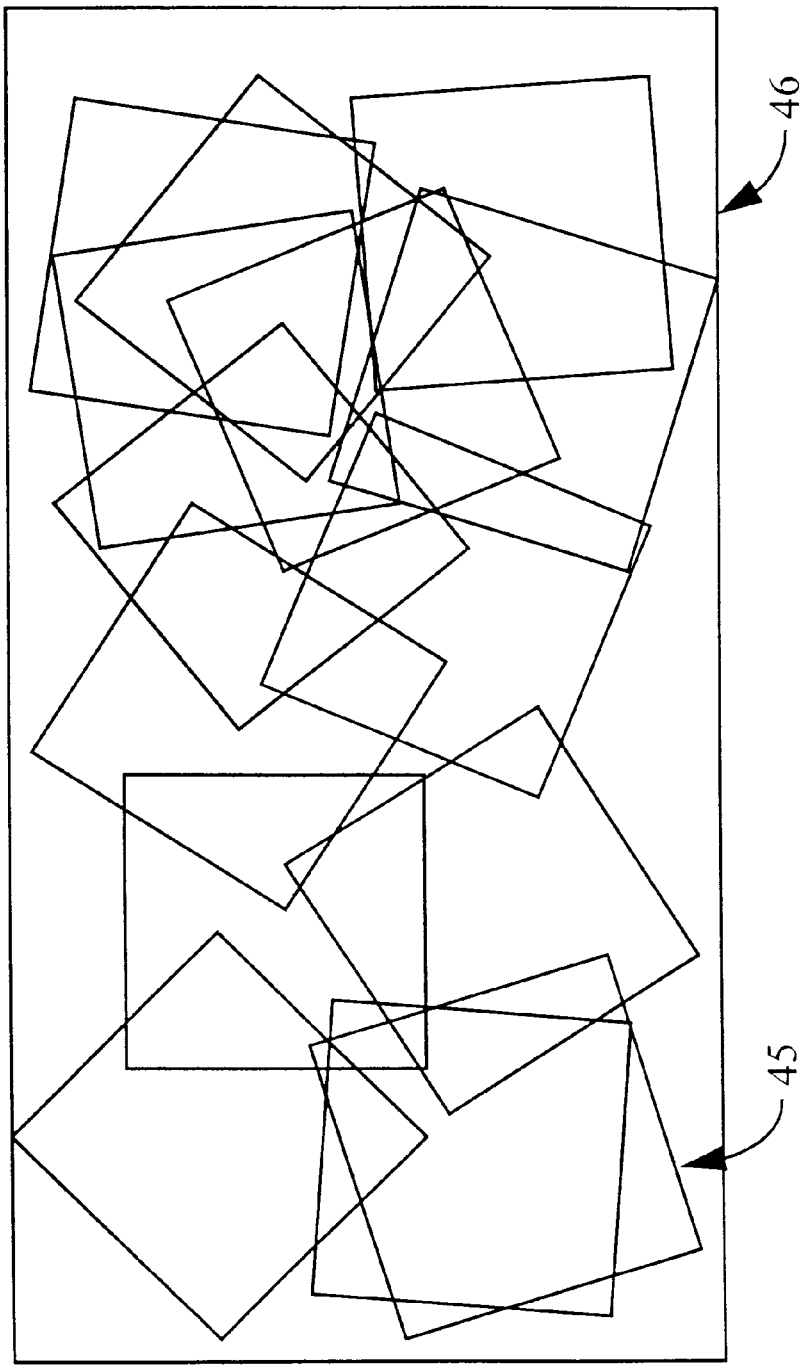
FIG. 8 illustrates a number of possible positions that a template could be located on an image desired to be detected.

The fourteen templates having rotations between 0 and 90° do not necessarily have to be in the same position on the bank note which is to be detected. The position of the template can be chosen so as to maximise its usefulness. Referring now to FIG. 8, there is shown an example of multiple templates 45 having differing rotations arranged on a bank note 46.

Figure 9:
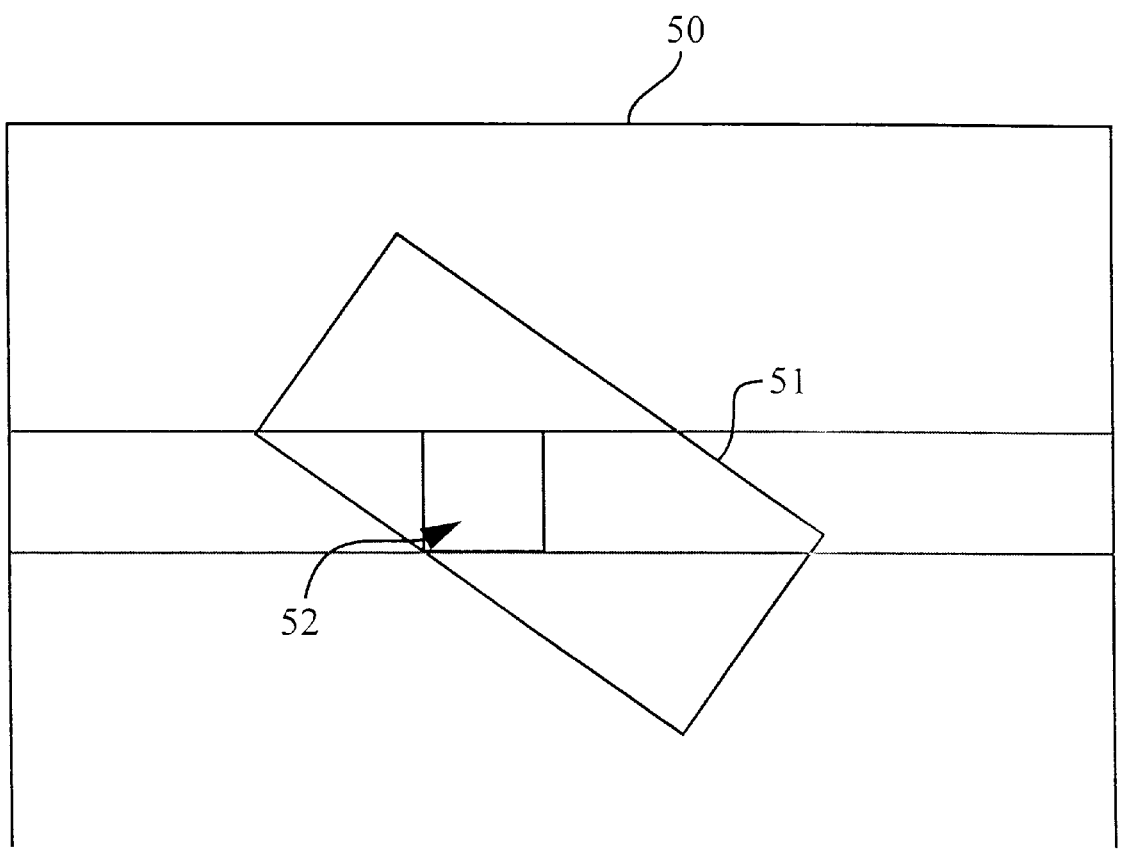
FIG. 9 illustrates the alignment of a template with a rotated bank note.

Turning now to FIG. 9 there is shown a scanned image 50, including a rotated bank note 51. A template 52, designed to detect this particular rotation of the bank note 51, is also shown. Importantly, the top and bottom edges of the template 52 are chose to be aligned with the lines of the scanned image 50 which, of course, are not necessarily the same as the edges of the banknote. This substantially eases the implementation requirements for detection of the template 52 in a line by line pixel stream corresponding to the scanned image 50.

Figure 10:
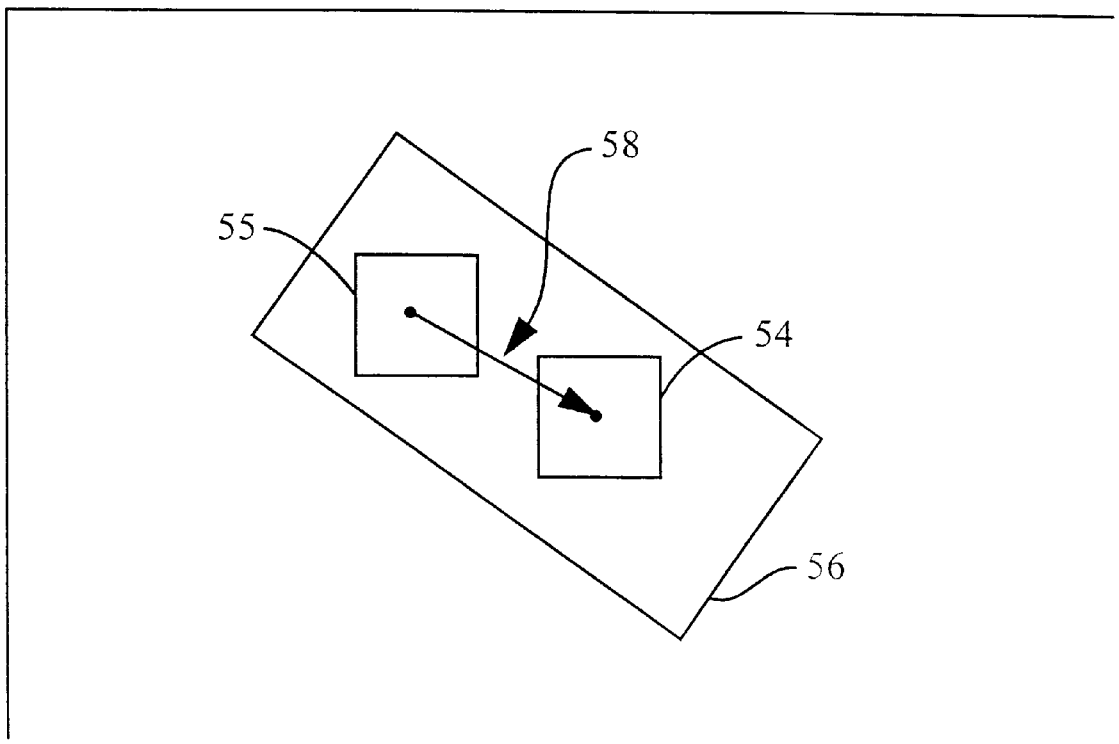
FIG. 10 illustrates the determination of a relative position vector between a pair of templates utilised in the preferred embodiment.

Referring now to FIG. 10, preferably a pair of templates 54, 55 is stored for each possible rotation (between 0 and 90°) of the bank note 56. This allows the detection module 14 (FIG. 2) to substantially reduce the occurrence of false positive detections as each template 54, 55 can be detected and a relative position vector 58 between the pair of detected templates can be measured. If this relative positional distance 58 is approximately equal to the expected length and direction of the relative positional vector of the scanned pair of templates, then a match can be determined to have taken place.

As discussed previously with reference to FIG. 4, a template 25 is made up of a series of cells 26. A template is compared with an input image by comparison of all of its cells with cells made up from the input image. If all the cells match, the template is determined to have been detected. The detection module 14 works on detecting the image from one colour pass of the pixel stream, with the colour pass preferably being magenta.

The information stored for each cell of a template in the ROM 15 is a pair of 4 bit numbers (MIN, MAX). To compare a cell against a block of 128×128 input image pixels, an average of the input image pixel values is calculated. This average is then rounded to four bits and if the final value is within the range (MIN, MAX), the cell is determined to have been matched. The range (MIN, MAX) is called a value range. The value ranges are stored in the ROM 15 and are precalculated as will be further described herein. In general, the width of the value range (MAX-MIN) depends on the portion of the bank note from which the value range comes. Areas with little variation in colour (e.g., plain white or plain black areas) produce narrow value ranges and areas with large variation in colour intensity (e.g. a face) produce a wide value range. The use of value ranges allows for small changes in position, rotation and scaling of the image relative to the template. Further, the use of an average value for an area of pixels is chosen because of its simplicity to calculate and its insensitivity to small changes in position and rotation. The use of 4 bit numbers is further chosen in the preferred embodiment to simplify hardware requirements and reduce the necessary ROM storage space.

The relevant value ranges for each cell for a particular bank note are predetermined using the following method:

The bank note is scanned by a computer system at the resolution at which it is to be printed and the magenta component is extracted and stored in a general computer system. For each required rotation $\theta(0 \leq \theta \leq 90°)$, the computer system performs the following function:

1. The bank note image is firstly rotated by an angle $\theta$ using known computer graphics techniques for rotating images.
2. The bank note image is then low pass filtered through the convolution of the image with a square box function being 128×128 pixels wide.
3. For each possible position of a template on a bank note, a "merit" value is calculated. Possible positions of templates are those where all four corners of the template lie within the original image or note, except where two opposite corners lie outside the image. This is to cater for cases where the width of the bank note is less than the size of the rotated template. The merit of a template position is the product of a template's "entropy" and "flatness". The entropy of the template is measured by calculating the sum of the differences between adjacent filtered pixel values in the template. Therefore the entropy is a measure of how much the brightness varies over the whole template and helps determine how useful the template will be. Clearly, a template which is a plain white is not of great use. The flatness of a template is a measure of the range of values over which the template varies over each cell.
4. for each possible pair of template positions on the bank note which do not overlap, the product of each template's merit is calculated. The pair with the highest product is used to determine the two positions of the template on the bank note.
5. Once the template position has been chosen, the corresponding low pass filtered image is sampled. The sampling process involves calculating, for each cell in the template, the minimum and maximum 4 bit numbers that the cell can have. In order to allow the translation and rotation within a group area, in addition to scaling, the position of each cell is allowed to vary.

Figures 11, 12, 13, 14:
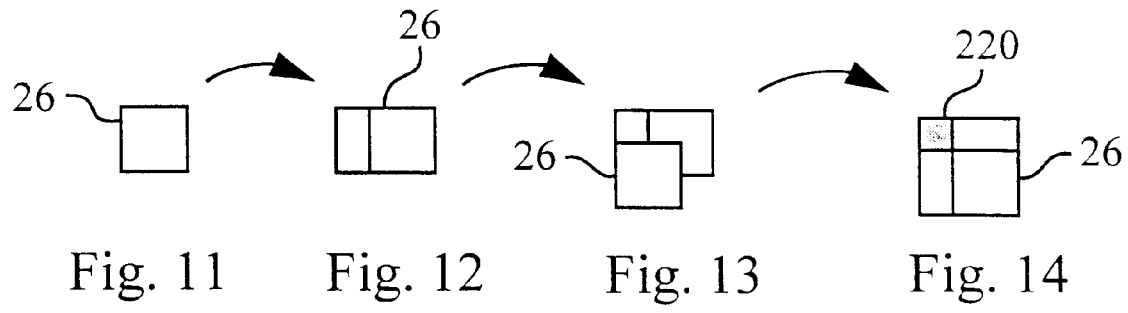
FIGS. 11 to 14 illustrate the process of translation of a cell of a template.

Turning now to FIGS. 11–16 the process of accounting for translation, rotation, and scaling will now be described. In FIG. 11, there is shown the single template cell 26 of FIG. 4. As discussed previously with reference to FIG. 5, each template is able to undergo translational movement so long as its top left hand corner remains within the same group area. Therefore cell 26 can be translated to the right as shown in FIG. 12. It can be further translated vertically down as shown in FIG. 13 and vertically and to the right as shown in FIG. 14. The top left hand corner of the cell 26 therefore can map out an area 220. Each of the pixels within the area 220 represents a point on which the top left hand corner of the cell 26 could begin.

Figure 15:
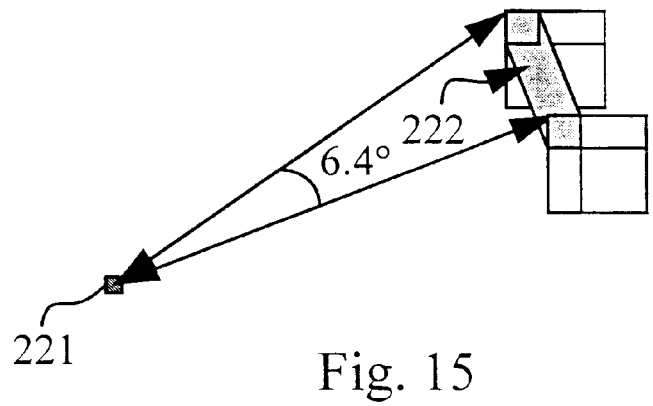
FIG. 15 illustrates the process of rotation of a cell.

Additionally, as noted previously a template is stored for each 6.4 degrees of rotation. As seen in FIG. 15, this means that the portion 220 of FIG. 14 can undergo a rotation of 6.4 degrees around a centre point 221 of the template. Therefore, taking into account the effects of translation and rotation, and area 222 will represent those possible values taken by the top left hand corner of the cell 26 under the effects of translation and rotation.

Figure 16:
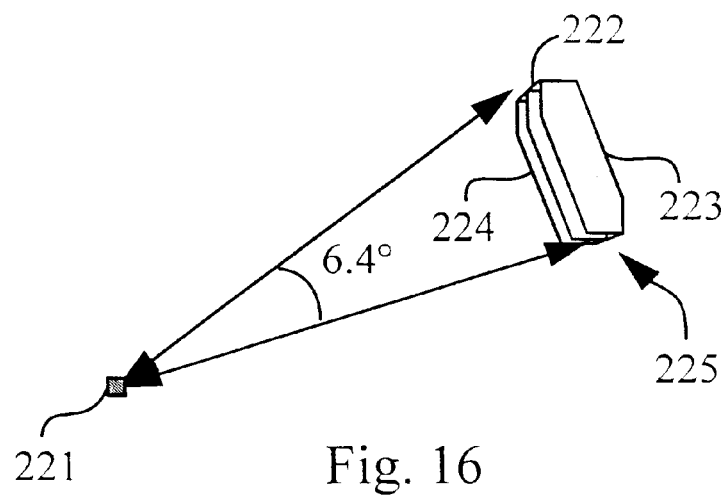
FIG. 16 illustrates the effect on a cell of scaling a template.

Finally, the preferred embodiment is configured to operate under the effects of scaling, including enlargement and reduction in the range of approximately 95%–105% of the original input image size. Turning now to FIG. 16, this is equivalent to a translation of the area 222 radially away from the centre of the template 221 to form area 223, in addition to the translation and scaling of the area 222 radially towards the centre of the template 221 as indicated by area 224. The convex hull 225 around the areas 222–224 represents the final area for which the top left hand edge of cell 26 can take. Therefore, for each cell within the template 25 of FIG. 4, the calculation of the convex hull is carried out and for each possible cell position, the low passed filtered image is sampled. The minimum and maximum values obtained for the samples then become the range of values that a cell can take.

Figure 17:
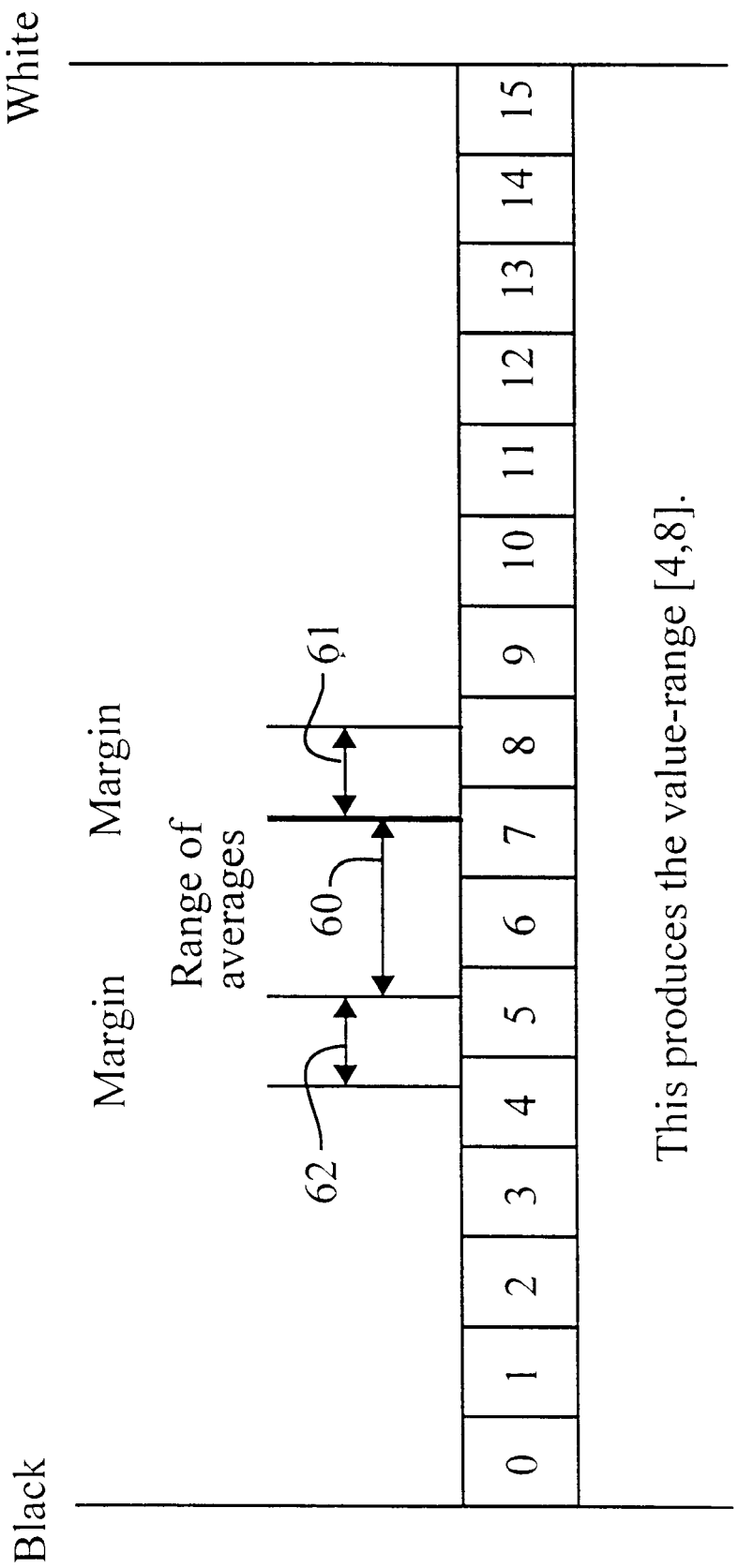
FIG. 17 illustrates the process of determining a value range.

Each different possible position produces a different value for the average of the cell. As shown in FIG. 17, in order to account for further noise in the input pixel stream 20, the range of values is incremented by adding a margin to each side of the range. It is assumed that these calculations are carried out using eight bit pixel value quantities, which is a standard format utilised in the art. The addition of the margin also allows for changes due to faded or dirty bank notes in addition to inaccurate calibrations. However, the choice of the size of the margin is important. If the margin is too small, the detection module 14 may fail to detect the bank note, and, if it is too large, the detection module 14 can falsely determine the detection of a bank note. Finally, the value range is reduced to a 4 bit number by extending it outward as shown in FIG. 12, to the nearest 1/16 boundary.

Figure 18:
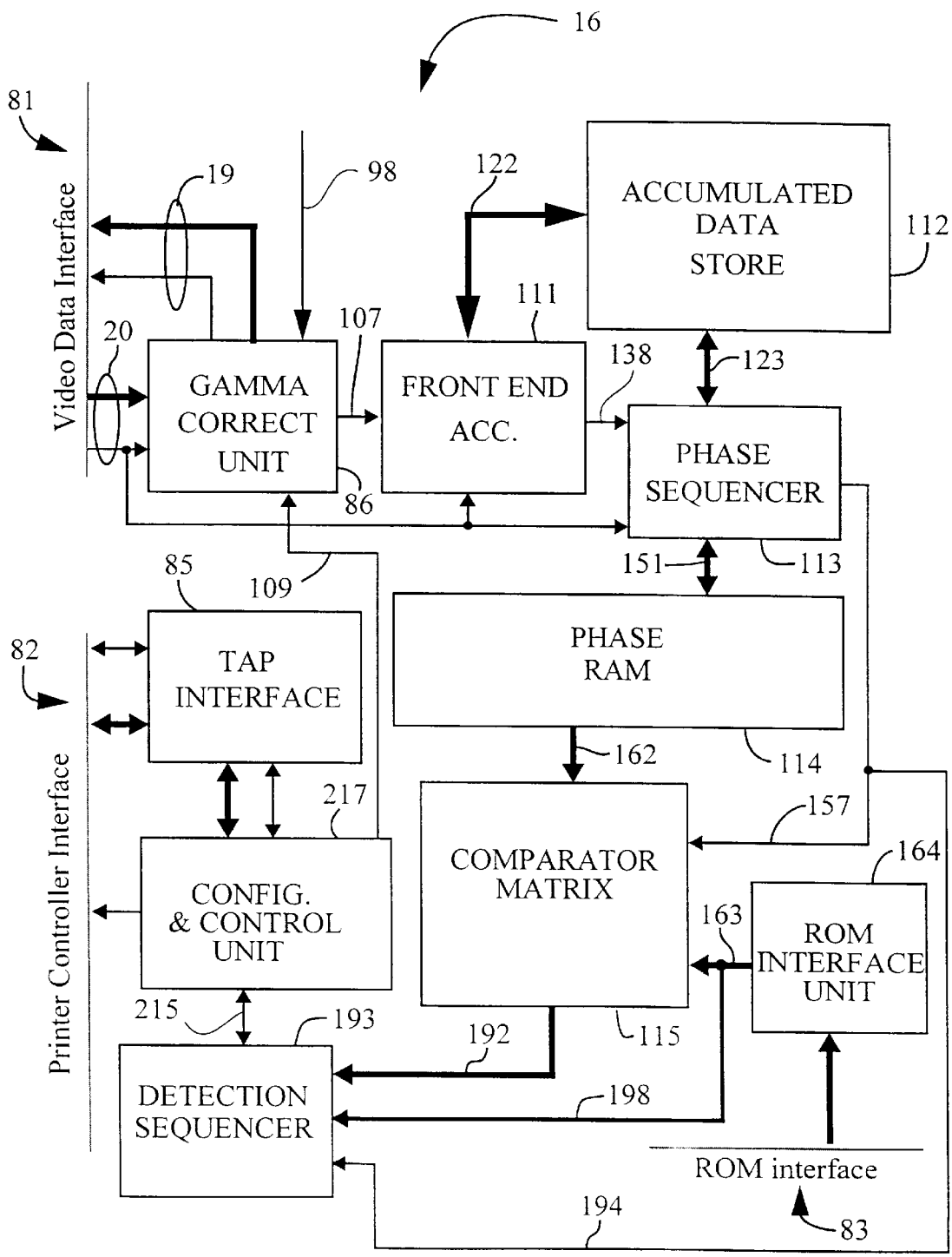
FIG. 18 is a schematic block diagram of the detection module of FIG. 2.

Referring now to FIG. 18, there is shown the detection ASIC 16 of FIG. 2 in more detail. The detection ASIC 16 includes a number of input/output interfaces including video data interface 81 for receiving the pixel data stream 20 from the printer controller 6 (FIG. 2) and for providing the pixel data output 19 to the modulation and laser driving circuitry 11 (FIG. 2). a printer controller interface 82 is provided for interconnection with the sequence controller 12 of the print engine 7 (FIG. 2). A ROM interface 83 is provided to connect detection ASIC 16 to the template ROM 15 (FIG. 2) via a ROM interface unit 164.

In Table 1 below there is shown those inputs comprising the video pixel data interface 81. During normal operation the "print" signal indicates that a new page of video pixel data is arriving for the printer controller 6. The pixel data stream 20 is sent in a four pass process, so the detection ASIC 16 synchronises to the pixel data stream 20 of the correct colour, which in the preferred embodiment is magenta. Each new colour is signalled by the "top" signal. When no forgery is detected, the pixel data is passed straight through the detection ASIC (vdo_out). If a forgery is detected, the vdo_out pixel data is blanked out by the detection ASIC 16. Additionally, the vclk_out pixel data clock can also be blanked out further preventing the output of pixel data.

TABLE 1

Video Pixel Data Interface

| Name | Type | Definition |
| --- | --- | --- |
| vclk_in | input | video data clock from video interface |
| lsync | input | line sync from video interface |
| top | input | top of page signal from video interface |
| prnt | input | print signal from video interface |
| vdo_in (7:0) | input | pixel data from video interface |
| vclk_out | output | video data clock to printer engine |
| vdo_out (7:0) | output | pixel data to printer engine |

Referring now to Table 2, there is shown the signal definitions of the standard ROM interface 83. The ROM interface 83 is provided for connection with up to four megabits of ROM 15 (FIG. 2).

TABLE 2

ROM Interface

| Name | Type | Definition |
| --- | --- | --- |
| rom_a (18:0) | output | ROM address |
| rom_d (15:0) | input | ROM data |
| rom0_oe_1 | output | programmable ROM output enable |
| rom1_oe_1 | output | programmable ROM output enable |

The printer controller interface 82 includes a detection signal for notifying the sequencer controller 12 (FIG. 2) when a template image has been detected. Additional signals provided by the printer controller interface 82 include a configuration signal for initialising the detection module 14, in addition to error signals including a IEEE standard 1149.1–1990 Test Access Port Interface (TAP) 85 which can be provided for writing to and testing all internal registers of the detection module 14.

Figure 19:
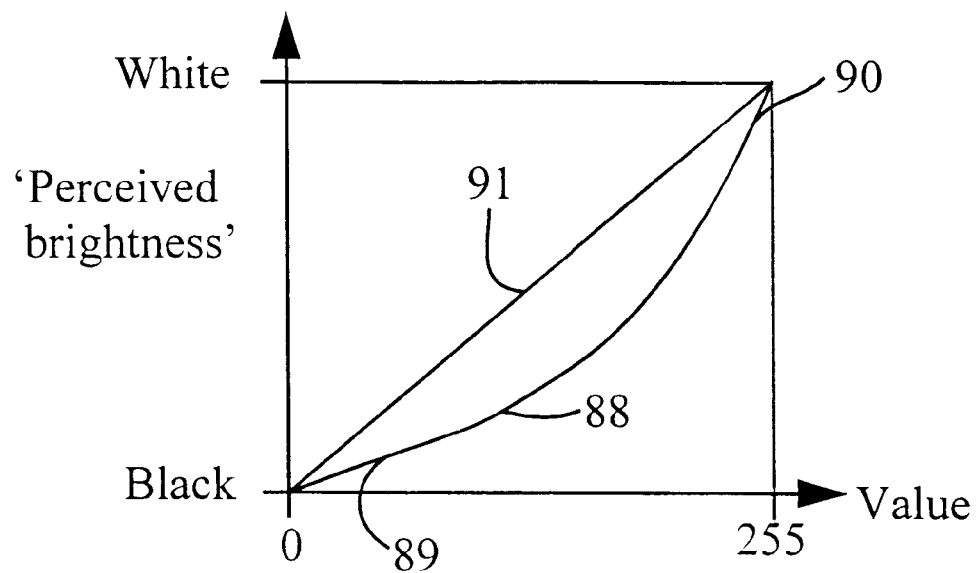
FIGS. 19 and 20 illustrate the process of gamma correction.
Figure 20:
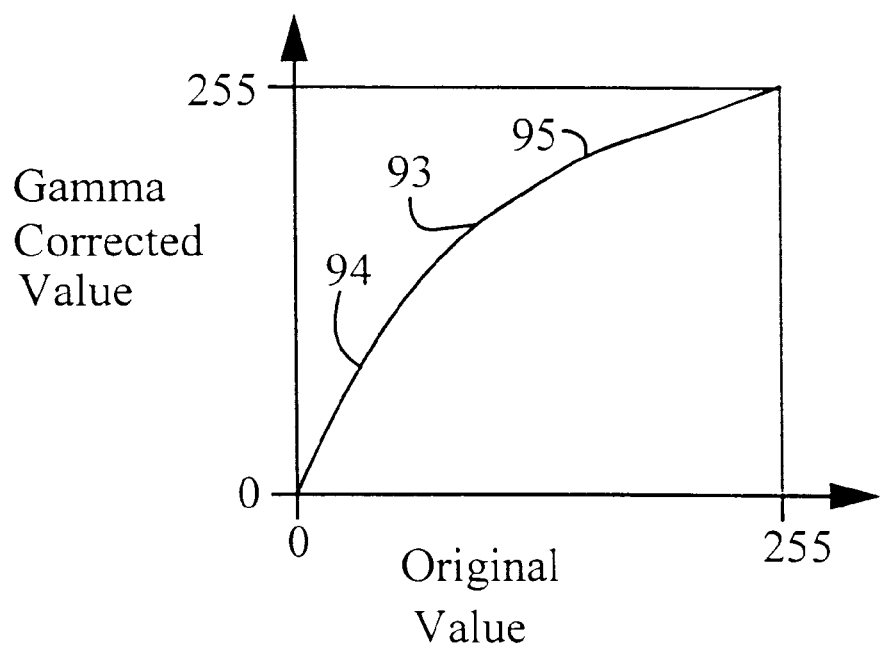

The pixel data 20 is fed from the video data interface 81 to a gamma correction unit 86. The gamma correction unit 86 is responsible for transforming the input video pixel data using a lookup table which is loaded form the ROM 15 during a startup sequence, in addition to blocking output video pixel data in the event of forgery being detected. The purpose of gamma correction is to ensure that the brightness values utilised by the detection module 14 are evenly distributed to the human eye. The minimal detectable change (MDC) is the smallest amount of change in brightness (expressed as an eight bit number) needed for the eye to notice a difference in brightness. For an evenly distributed brightness, the MDC is the same for all brightness values. Referring now to FIG. 19, there is shown a graph of perceived brightness verses output value. The lower curve 88 shows the normal perceived brightness function of an output image. This curve 88 includes a lower portion 89 where perceived brightness changes very slowly and a upper portion of the curve 90 where the brightness changes rapidly. The purpose of gamma correction is to alter the perceived brightness curve so that it takes the form of a curve 91 which has an evenly distributed perceived brightness. Referring now to FIG. 20, there is shown a gamma correction mapping to translate the curve 88 to the curve 91 of FIG. 19. The gamma correction curve includes portions 93 and 94 where there is a rapid change to counter the slow change perceived by the eye and a portion 95 where there is a slow change so as to counter the rapid change perceived to the eye.

Figure 21:
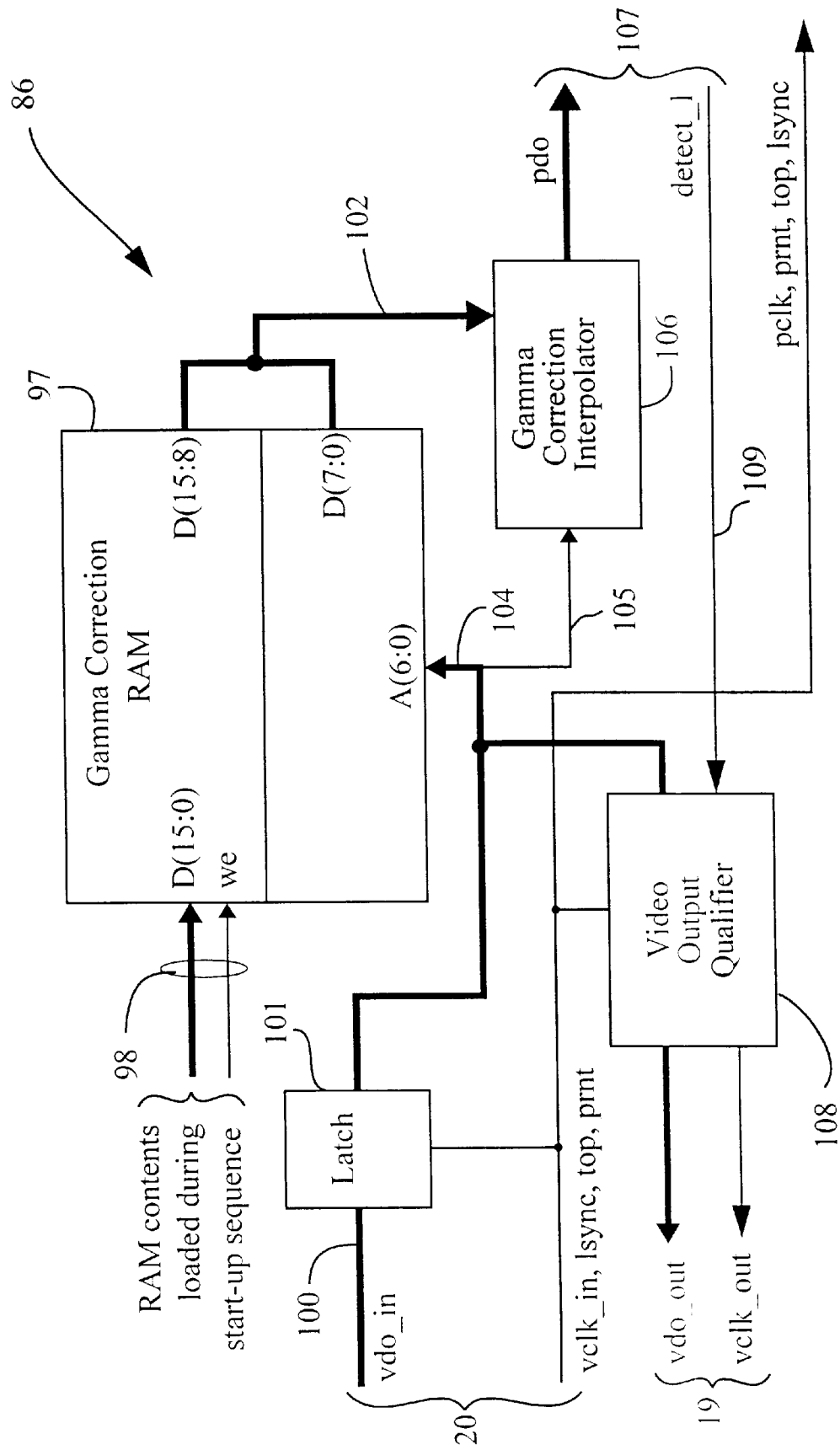
FIG. 21 is a schematic block diagram of the gamma correction unit of FIG. 18.

Turning now to FIG. 21, there is shown the gamma correction unit 86 in more detail. A gamma correction RAM 97, designed to implement the gamma correction curve of FIG. 20, is provided and is loaded via an input 98 from the CPU 18 during startup of the detection module 14. Input pixel data 100 is input via a latch 101 before being used as the address to the gamma correction RAM 97 and used to produce a gamma corrected output 102.

The gamma correction RAM 97 stores gamma correction values as pairs of eight bit values, with each pair representing gamma corrected values for input data that is 0 modulo 4. The address of the gamma correction RAM 97 is formed from the upper six bits 104 of incoming pixel data. The lower two bits 105 are used to interpolate between the pair of gamma corrected output values 102 by an interpolator 106 to produce final gamma corrected output value 107. A video output qualifier 108, which comprises a multiplexer with one input connected to ground, is provided to blank out the output pixel data stream 20 on the occurrence of the detection of a template which is indicated via a detection signal 109.

Referring again to FIG. 18, pixel data areas corresponding to a single cell 26 are 128×128 pixels wide and are averaged by a front end accumulator 111 and accumulated data store 112. The accumulated data store 112 stores an average of each 64×64 block of pixels. The template cells 26 (FIG. 4) are however 128×128 pixels wide. A particular template cell is therefore derived from adding together four groups of accumulated data store values by a phase sequencer 113 and the result is stored in a phase RAM 114.

Figure 22:
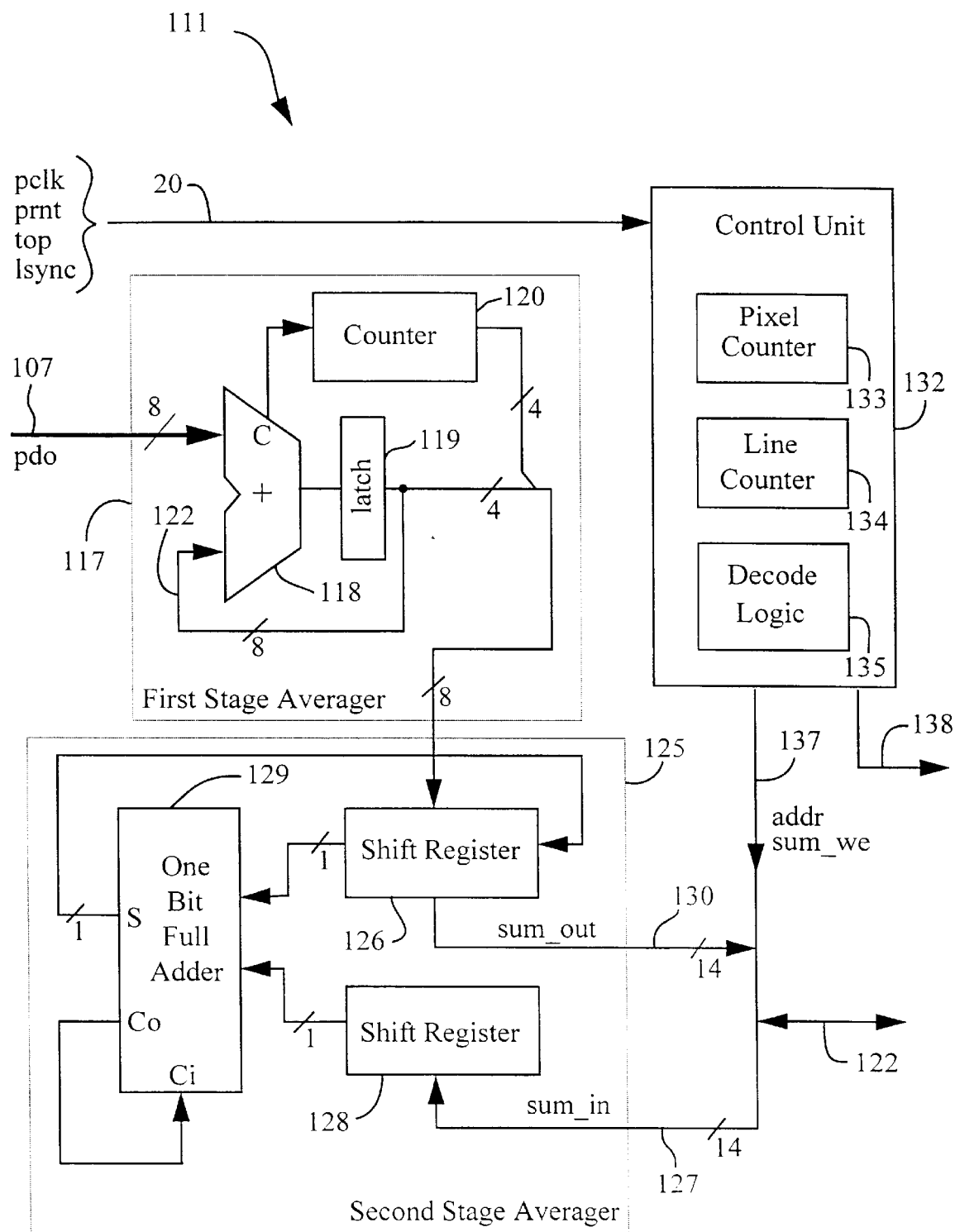
FIG. 22 is a schematic block diagram of the front end accumulator of FIG. 18.

Referring now to FIG. 22, there is shown the front end accumulator 111 of FIG. 18 in more detail. The front end accumulator 111 is responsible for constructing each 64×64 pixel average and storage of the average in the accumulated data store 112 (FIG. 18). The front end accumulator includes a first stage averager 117 which adds together 64 horizontally adjacent pixels arriving from the gamma correction unit 86. The first stage averager 117 includes an adder 118, a latch 119 and a counter 120.

The front end accumulator 117 reads in pixel values into the adder 118. The pixel values are added to a previously accumulated sum and stored in the latch 119 thereby forming a new accumulated sum. Each time an overflow condition occurs, the counter 120 is incremented (the counter 120 having been reset at the start of each set of 64 pixels). At the end of a 64 pixel group, the output to a second stage averager 125 is formed form the four most significant bits from the latch 119 and four bits from the counter 120.

Once an average of 64 pixels has been determined it is forwarded to a shift register 126 of a second stage averager 125. Here, the average of the 64 pixels is added to a previous partial sum 127 which is fed form the accumulated data store 112 (FIG. 18) and stored in a shift register 128. The two values are added by a one bit full adder 129 before being output 130 back to the accumulated data store 112 (FIG. 18) via the bus 122. The second stage averager 125 interleaves its access to the accumulated data store 112 with that required by the phase sequencer 113 (FIG. 18). A control unit 132 includes pixel counter 133 and line counter 134 to determine the boarders of lots of 64 pixels in addition to decoding logic 135 to generate the necessary control signals for the front end accumulator 111 in addition to the necessary address and control signals 137 for the accumulated data store 112.

Referring again to FIG. 18, the accumulated data store 112 stores the partially constructed 64×64 pixel cell averages. The pixel cell averages are constructed and written to the accumulated data store 112 by the front end accumulator 111 and read by the phase sequencer 113 to construct a 128×128 pixel cell average which is placed in the phase store RAM 114.

Figure 23:
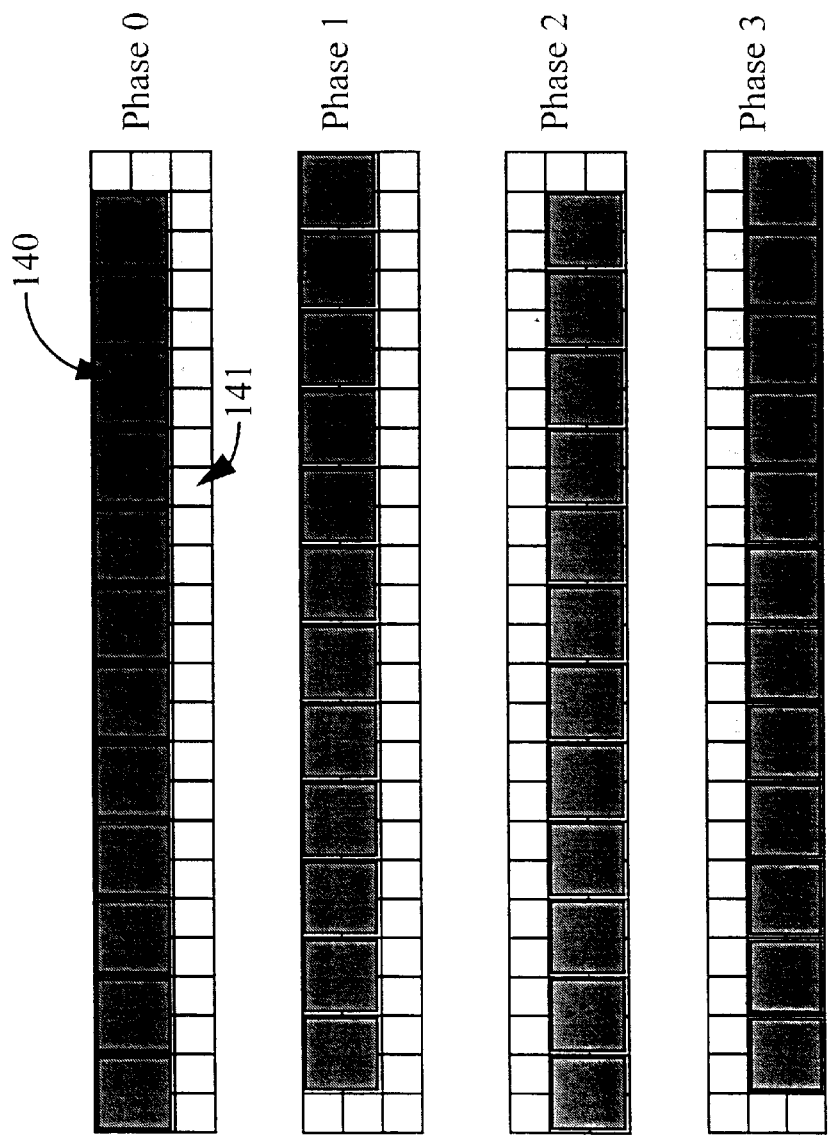
FIG. 23 illustrates the different template phases utilised in the preferred embodiment.
Figure 24:
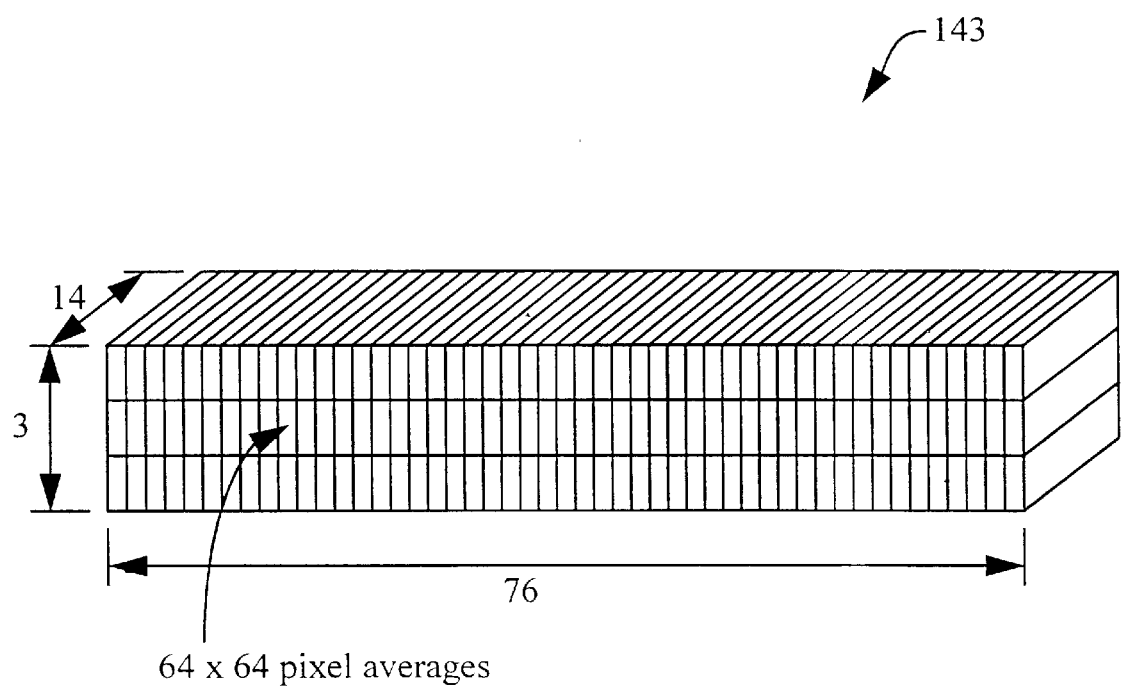
FIG. 24 illustrates the data organisation of the accumulated data store of FIG. 18.

Turning to FIG. 23, there is shown the process of construction of 128×128 pixel averages from 64×64 pixel averages. The 128×128 pixel cell average constructed will depend upon the phase of the particular cell. The construction of the 128×128 pixel cells 140 by the phases sequencer 113 (FIG. 18) proceeds in parallel with the construction of the subsequent 64×64 pixel cell averages 141 by front end accumulator 111. The number of 64×64 pixel cell averages 141 which are required will of course be dependant on the cell size however, it will be assumed, for the purpose of discussion of the preferred embodiment, that a maximum of 76 pixel averages 141 are required for one line. In FIG. 24, there is shown the arrangement 143 of data stored in the accumulated data store 112 (FIG. 18). The required capacity of the accumulated data store in 3 rows×76 columns×14 bits per data entry which gives a total of 3,192 bits of data.

Figure 25:
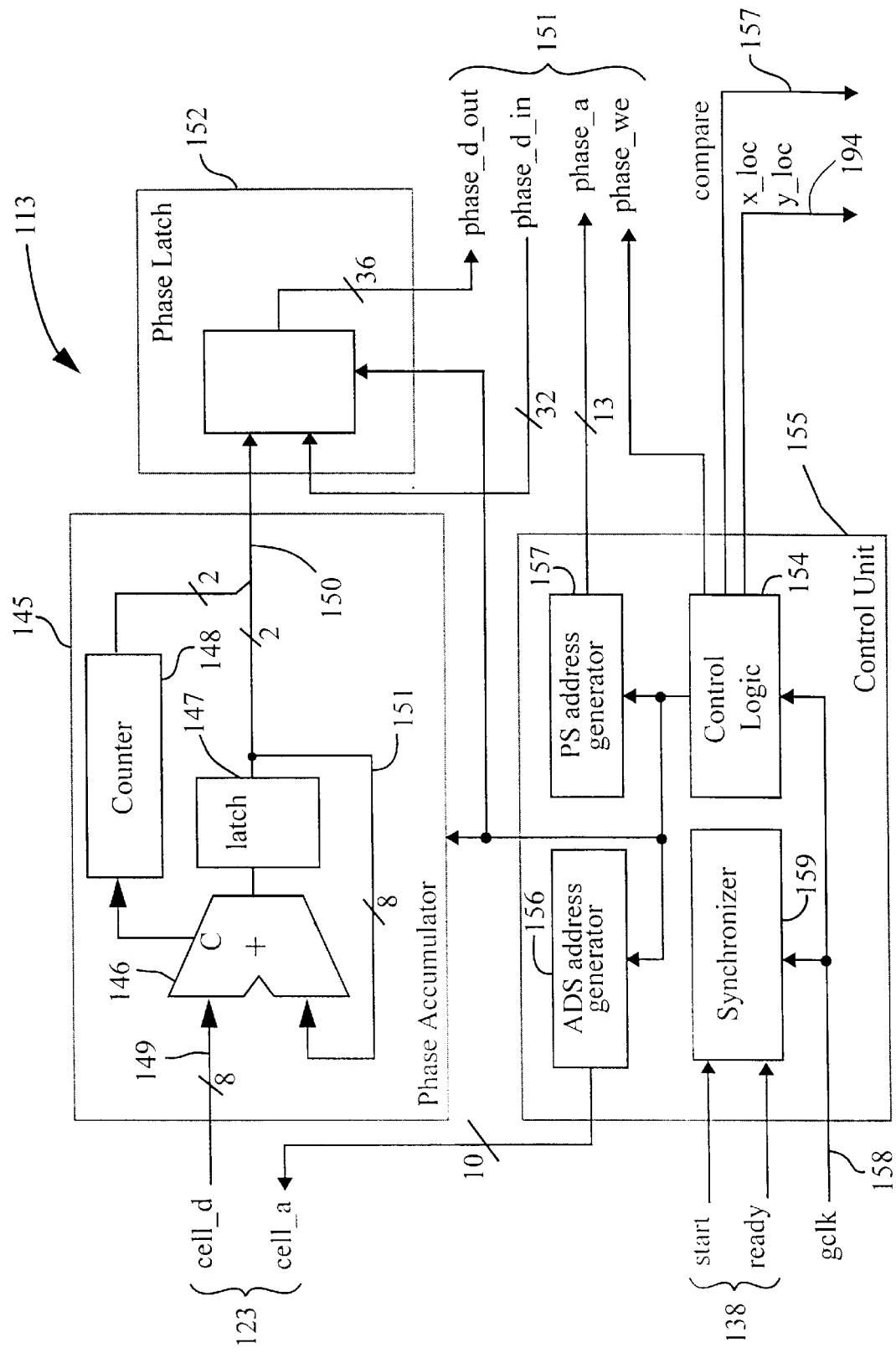
FIG. 25 is a schematic block diagram of the phase sequencer of FIG. 18.

Referring now to FIG. 25, there is shown the phase sequencer 113 of FIG. 18 in more detail. The phase sequencer 113 performs three main tasks including:
1. The construction of cell data from the accumulated data store 112 by the averaging of four adjacent 64×64 pixel blocks as illustrated in FIG. 23.
2. The generation of addresses and the storage of generated data in the phase store RAM 114.
3. The generation of control and address signals for a comparator matrix 115 (FIG. 18).

The phase sequencer 113 includes a phase accumulator 145 which reads in the four adjacent 64×64 average cell values from accumulated data store 112 and adds them together in an adder 146. Intermediate values are stored in a latch 147. The output of the latch 147 is fed back to form one of inputs to the adder 146, the other input being via a bidirectional bus 123 from the accumulated data store 112. Each time an overflow operation occurs in the adder 146, a counter 148 is incremented. An output 150 of the phase accumulator 145 is formed from the four most significant bits derived as a result of the addition of the four adjacent cells by the phase accumulator 145. This output is fed to a phase latch 152 before being forwarded to the phase RAM 114 (FIG. 18).

Figure 26:
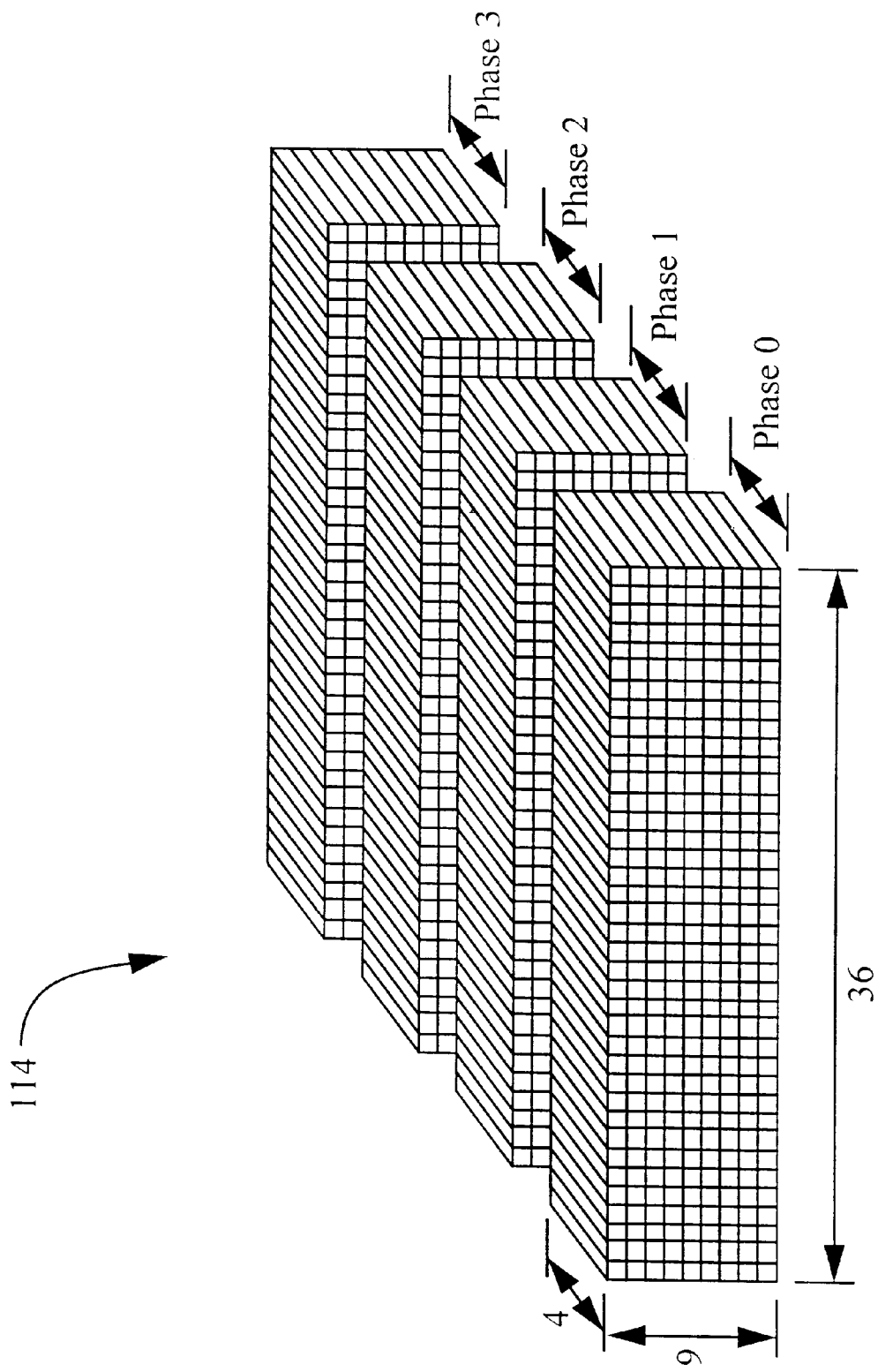
FIG. 26 illustrates the data storage arrangement of the phase RAM of FIG. 18.

As shown in FIG. 26, the phase RAM 114 is divided into four phase areas designated phase 0 to phase 3. Each phase area includes nine rows, corresponding to the height of the template, in addition to 36 columns, corresponding to the number of cells in a line, and is four bits deep, with each cell having a 4 bit value or magnitude.

Referring again to FIG. 25, the phase latch 152 builds the data for a whole column of the phase store by effectively shifting the contents of the phase latch 152 by four bits to the right each time new data is received form the phase accumulator 145. The 36 bit data is read out and forwarded to the phase RAM 114 via a bidirectional bus 151. When reading the data back from the phase RAM 114 only 32 bits are utilised with the top four bits being thrown away as they are returned to the latch 152 under the control of control logic 154 within a control unit 155. The control unit 155 also includes an accumulator data store address generator 156 for generating the requisite addresses for the accumulated data store 112 in accordance with the scheme outlined in FIG. 23. Additionally, a phase store address generator 157 is provided for generating addresses for the phase RAM 114.

As will be further discussed hereinafter, the clocking scheme of the detection module 14 can, under certain circumstances, be derived from the global pixel stream of the overall copier system 1. A global clock can be provided by configuration and control unit 217 (FIG. 18) in accordance with a number of schemes. In the preferred embodiment, the required pixel clocking frequency of the detection module 14 is below that of the pixel stream. However, the global clocking scheme of the detection module 14, designated gclk 158 can, in some embodiments, be greater than that of the input data stream. Therefore, synchronisation of the clocking speed of the input pixel data stream must occur relative to the global clock (gclk). This occurs via a synchroniser unit 159 which receives the control signals 138 and synchronises a start signal from the front end accumulator 111 which indicates the start of a new page, in addition to synchronising a ready signal from the front end accumulator 111, which indicates pixel data is ready for reading by the phase sequencer 113.

Figure 27:
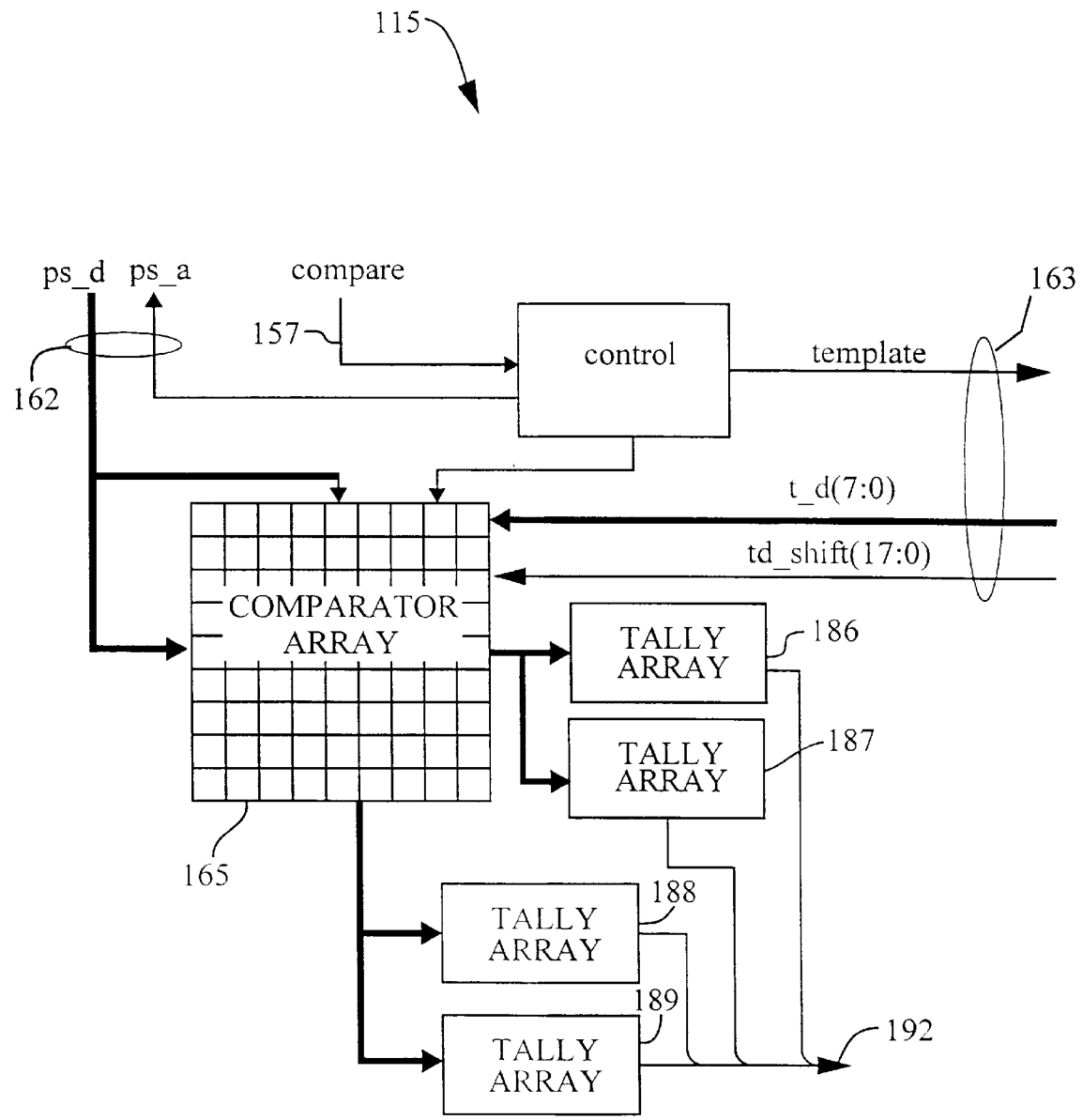
FIG. 27 is a schematic block diagram of the comparator matrix of FIG. 18.

Turning now to FIG. 27 there is shown the comparator matrix 115 of FIG. 18 in more detail. The comparator matrix 115 is an important part of the detection module 14 as it facilitates a high rate of comparisons in detecting image data from phase data and template data. The comparator matrix 115 reads phase data 162 from the phase data ram 114 (FIG. 18), in addition to reading template data 163 from a ROM interface unit 164 connected to the ROM interface 83, both of which are supplied to a comparator array 165 (FIG. 27). The template ROM 15 has a series of templates stored therein corresponding to the different templates 45 (FIG. 8) for different rotations of a given image in addition to different images. The results of comparisons performed by the comparator array 165 for each rotation of a template are forwarded to a series of tally arrays 186–189. Each tally array 186–189 determines the number of matches for a particular rotation of the template which is to be matched. The tally arrays 186–189 output a template detection signal 192 when a template match is detected.

Figure 28:
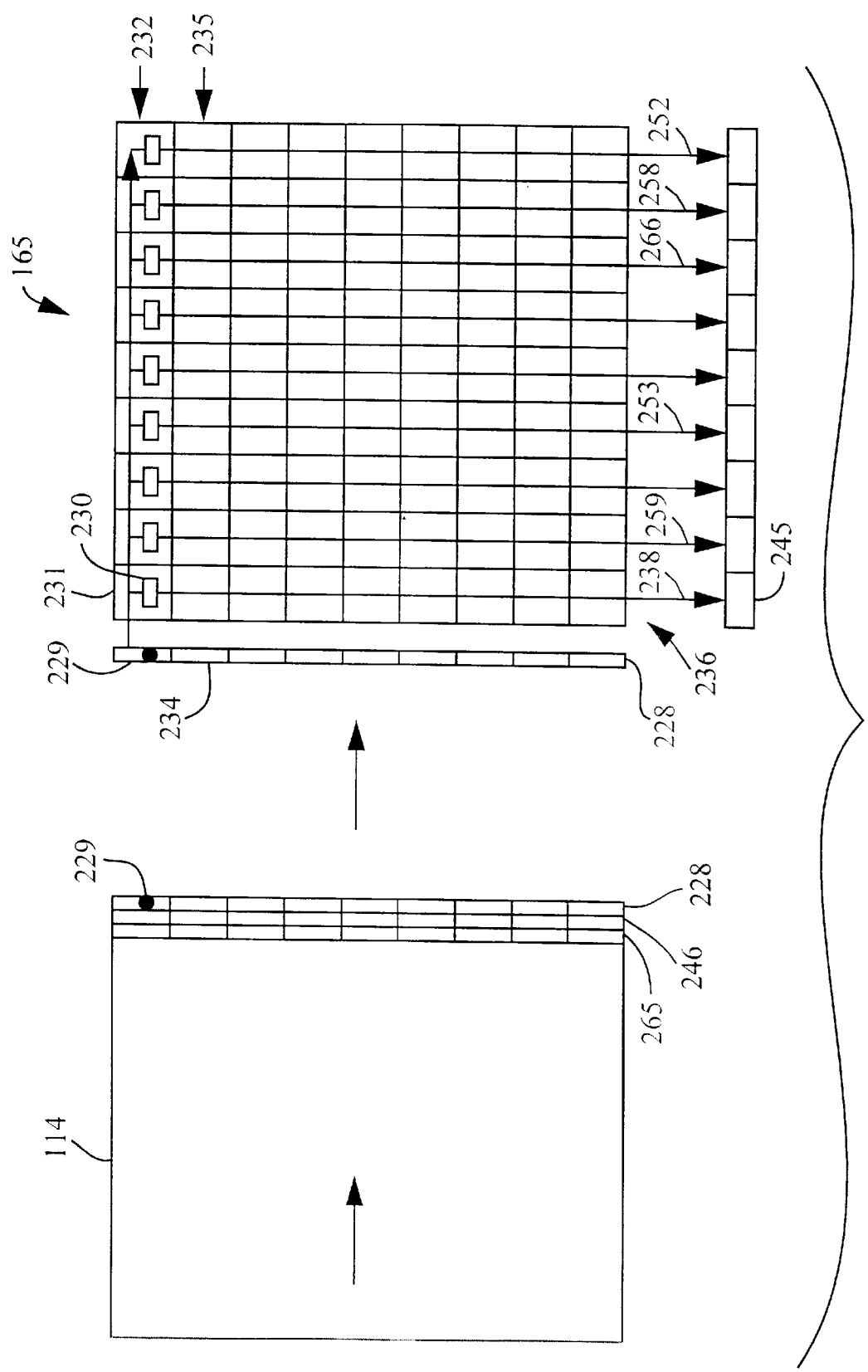
FIG. 28 illustrates a first form of feeding columns from the phase RAM to the comparator array of FIG. 27.

Referring now to FIG. 28, the general principles of operation of the comparator array 165 will now be explained in more detail. Data for a band of cells is fed, column by column, out of the phase RAM 114. A band of cell data values consist of columns 228 with each column containing nine 4-bit cell values 229. The data is output from the phase RAM 114 to the input bus of the comparator array 165. A data value, e.g. 229, is then compared 230 with a range of values for each comparator cell 231 for a whole row 232 of comparator cells. Similarly, the cell value 234 is compared against values stored in the comparator cells of row 235. A similar process is carried out for all the other entries in column 228.

Figure 29:
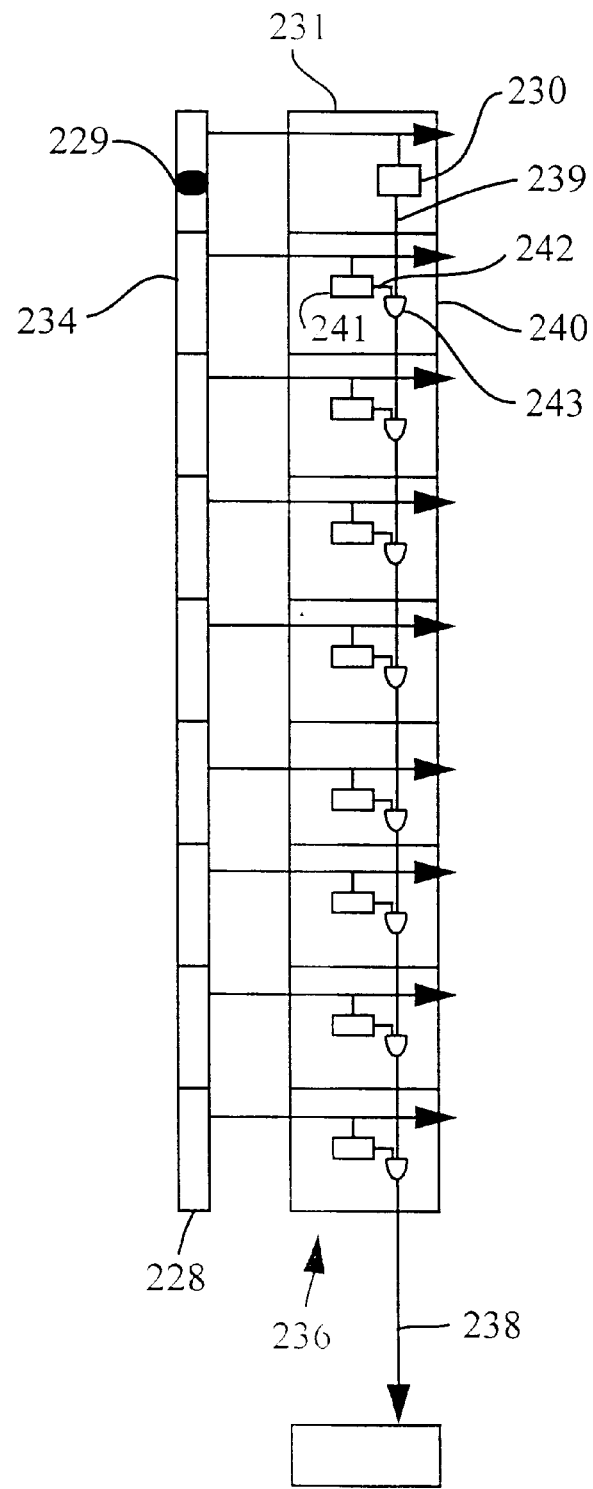
FIG. 29 is a schematic illustration of one column of the comparator array of FIG. 27.

Referring now to FIG. 29, there is shown a single column 236 of comparator cell entries 231 in addition to corresponding column of input entries 228.

The data value on the input bus corresponding to entry 229 is compared at 230 to determine if it is within a range of values stored within the comparator cell 231. The output signal 239 is therefore high when the data entry 229 is within the range of values stored in comparator cell 231. Similarly, the second data entry 234 is compared at 241 with a range of values stored within comparator cell 240 and the output 242 is "ANDed" by AND gate 243, whose other input is the output 239 from cell 231. A similar process is carried out for all the other cells within a column. Therefore, a serially obtained output 238 will be active only when all the cell entries of column 236 are activated. This occurs when all the cell data values within column 228 are within the ranges of values stored within corresponding comparator cells of column 236.

Figure 30:
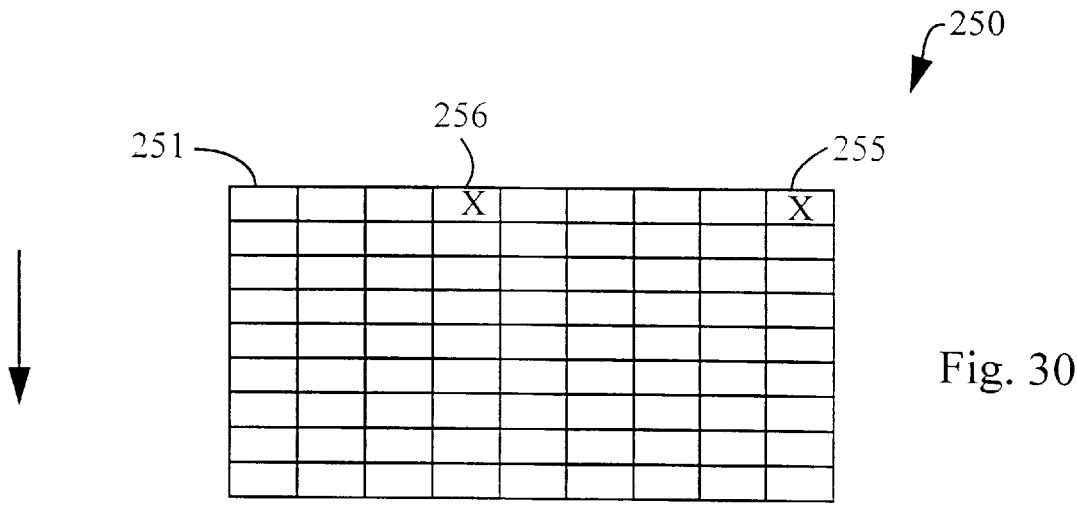
FIGS. 30 to 33 illustrate the process of determining whether a template match has occurred.
Figure 34:
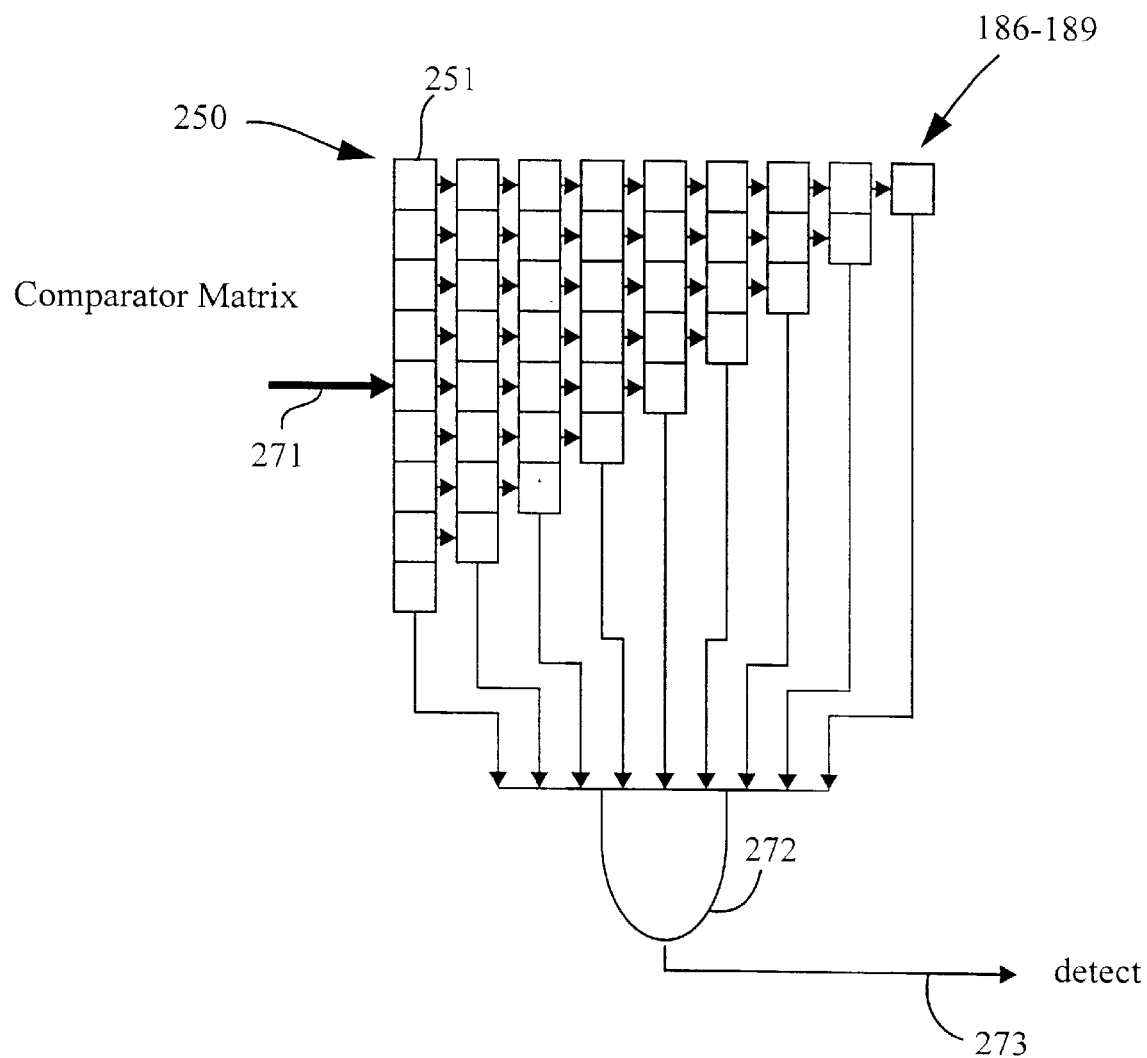
FIG. 34 is a schematic block diagram of a tally array of FIG. 27.

Referring again to FIG. 28, the output of a column comparison 238 is initially latched 245 and the next column 246 is then forwarded in turn to the comparator array 165. The outputs from the comparator array 165 are forwarded to a first tally array 186 (FIG. 27). Referring now to FIGS. 30 and 34, the tally array 186 (FIG. 27) includes a shift register matrix 250 that consists of a 9×9 array of shift registers 251 that retain a tally of those comparator outputs 238 (FIG. 28) which produced positive results. Therefore, assuming that outputs 252, 253 (FIG. 28) are activated when initial column 228 is fed to the comparator array 165, then shift register latch entries 255, 256 will store a high value indicating the occurrence of this event.

Figure 31:
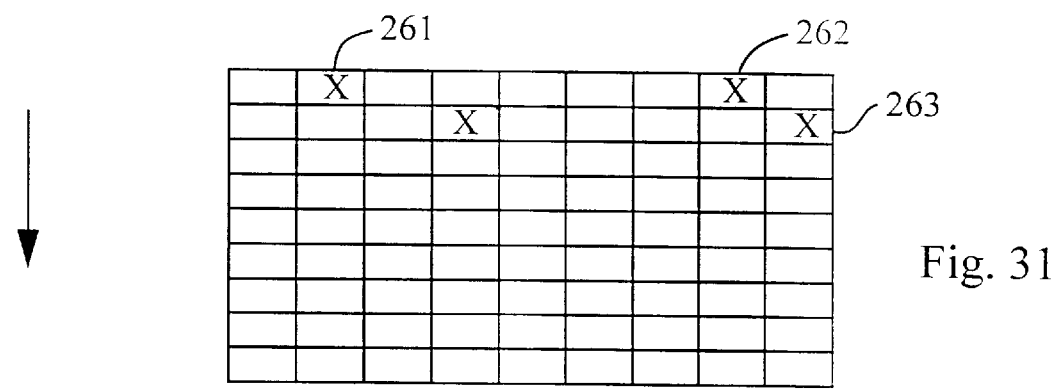

Referring now to FIG. 31 and FIG. 28, in the next clock cycle column 246 is forwarded to the comparator array 165 and it is assumed that outputs 258, 259 are activated and latched by the tally array entries 261, 262, with the previous entries being shifted to row 263.

Figure 32:
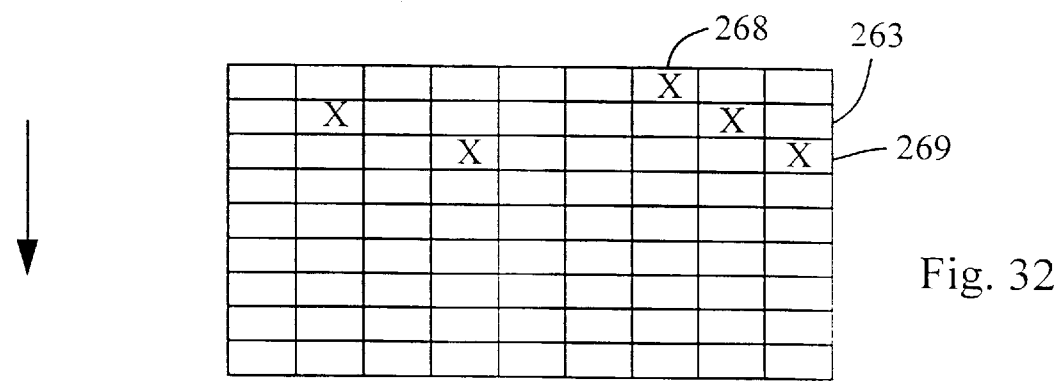

Referring now to FIG. 32 and FIG. 28, in the next clock cycle data column 265 is forwarded to the comparator matrix 165 and, it will be assumed, that output 266 is the only output line activated. This activation is latched 268 (FIG. 32) with the previous activation data being shifted down one row to row 269.

Figure 33:
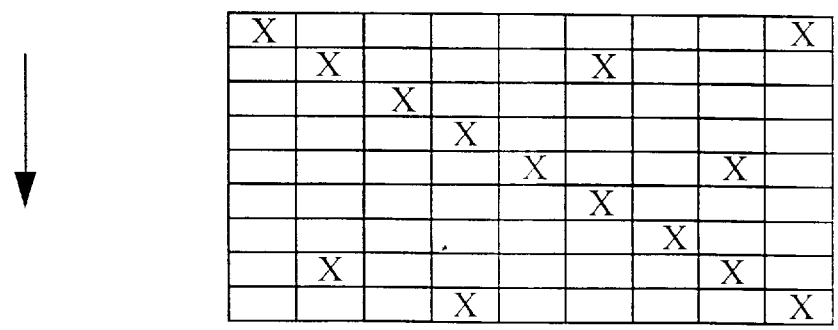

Referring now to FIG. 33, there is shown the criterion necessary for a template detection to have occurred. This condition occurs when a diagonal of template matches has occurred. This condition will occur when consecutive columns of cell data 228 (FIG. 28) are matched by corresponding consecutive columns of the comparator matrix 165. It can be seen from FIG. 33, that in order to detect the diagonal, it is not necessary to store the lower left hand portion of the prior detection data. Hence, the shift registers required for this area can be dispensed with and a consequential saving in cost and layout area obtained.

Turning now to FIG. 34, there is shown the layout of a tally array 186–189 in more detail. The tally array includes a shift register matrix 250. Detection signals 271 are fed from the comparator matrix 165 to a series of shift registers 251. AND gate 272 is utilised to detect the occurrence of diagonal validation signals, outputting a detect signal 273 when all diagonal shift registers contain active data.

Referring again to FIG. 27, tally array 186 is designed to detect occurrences of the template in a 0° rotation. The comparator array 165 is also designed to allow for simultaneous detection of 90, 180 and 270 degree rotation of the template data in the input stream.

Figure 35:
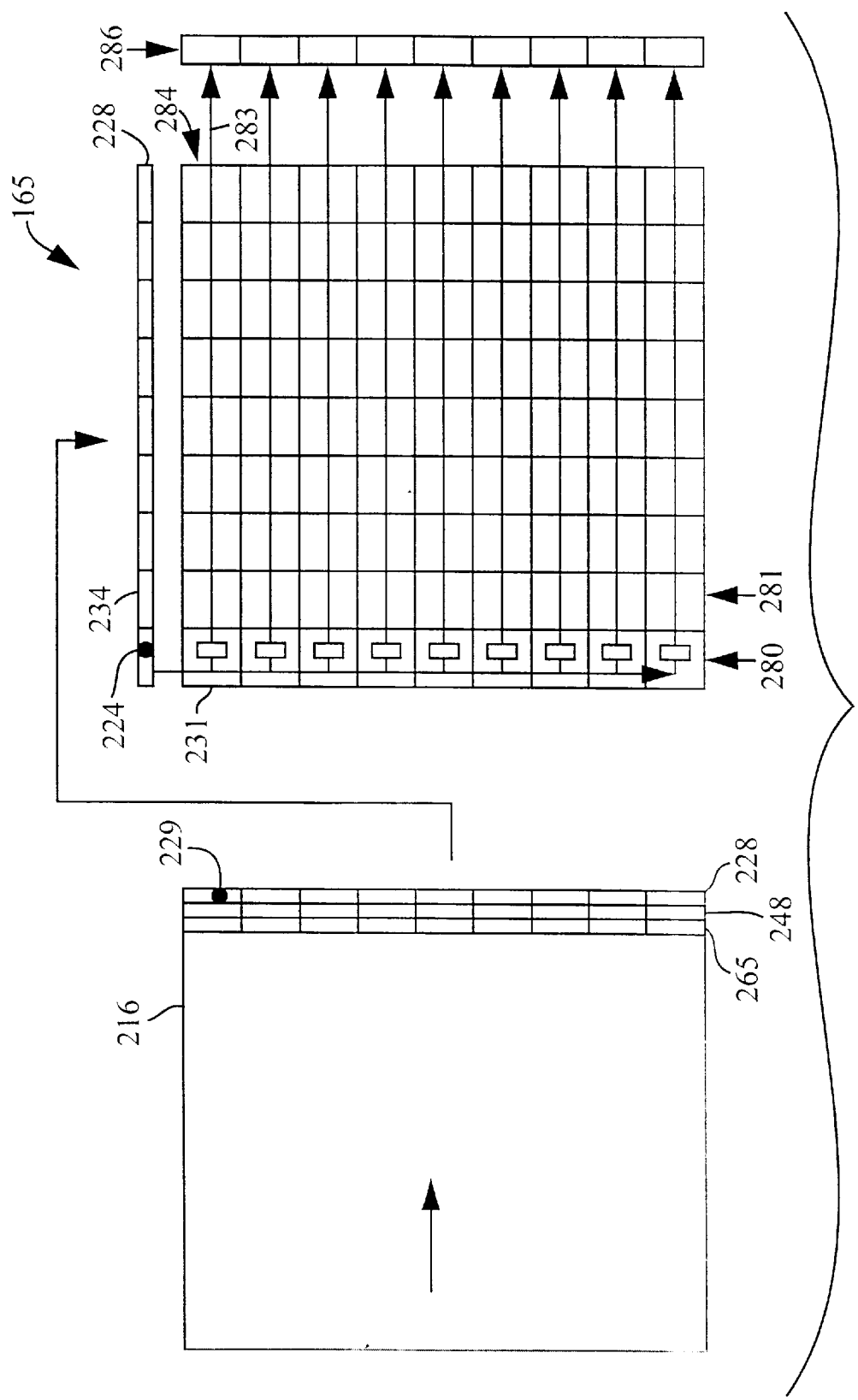
FIG. 35 illustrates a second form of feeding columns from the phase RAM to the comparator array of FIG. 27.

Referring now to FIG. 35, in order to detect 90° rotations, each column of cell data 228 is also fed into the comparator array 165 from above. Cell data 228 is compared against the range values contained in all of the cells 231 of column 280. Similarly, data entry 234 is compared with all the cell entries in column 281. Also, although not shown, all of the other entries in row 228 are compared with values in corresponding columns of the comparator array 165.

The output 283 of a row 284 is obtained in an analogous manner to output 238 of FIG. 28, in that the cell outputs of each cell in row 284 are ANDed together (not shown in FIG. 35) to form final output 283. The other row of the comparator matrix 165 also output values derived in the same manner.

The output of the comparator matrix are latched into shift registers 286 which forms part of a tally array 188 (FIG. 27). The tally array 188 operates in a similar manner as tally array 186, however, for the 90° rotation case, the opposite diagonal must be detected.

Figure 36:
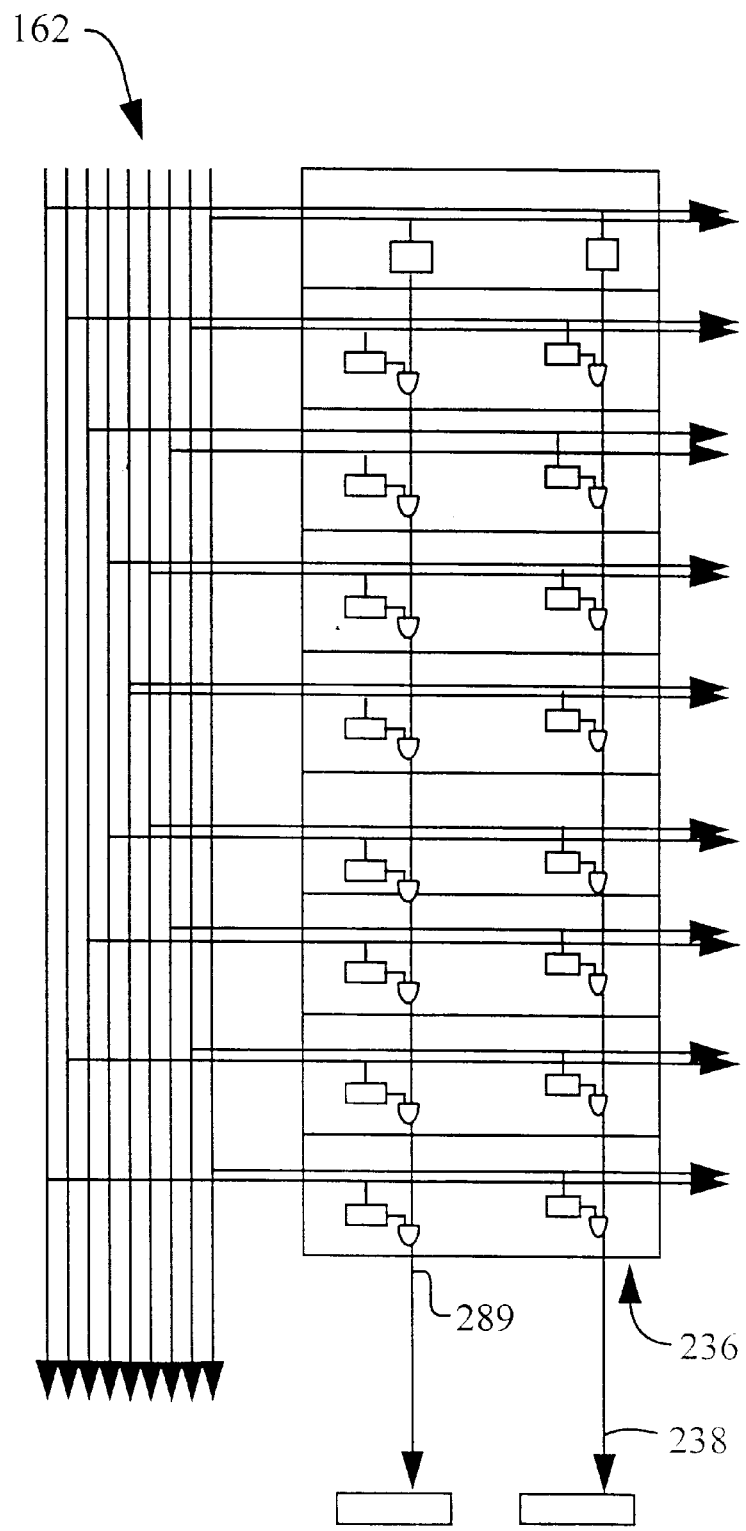
FIG. 36 illustrates simultaneously determining a match for a 0° and 180° rotation of a column.
Figure 39:
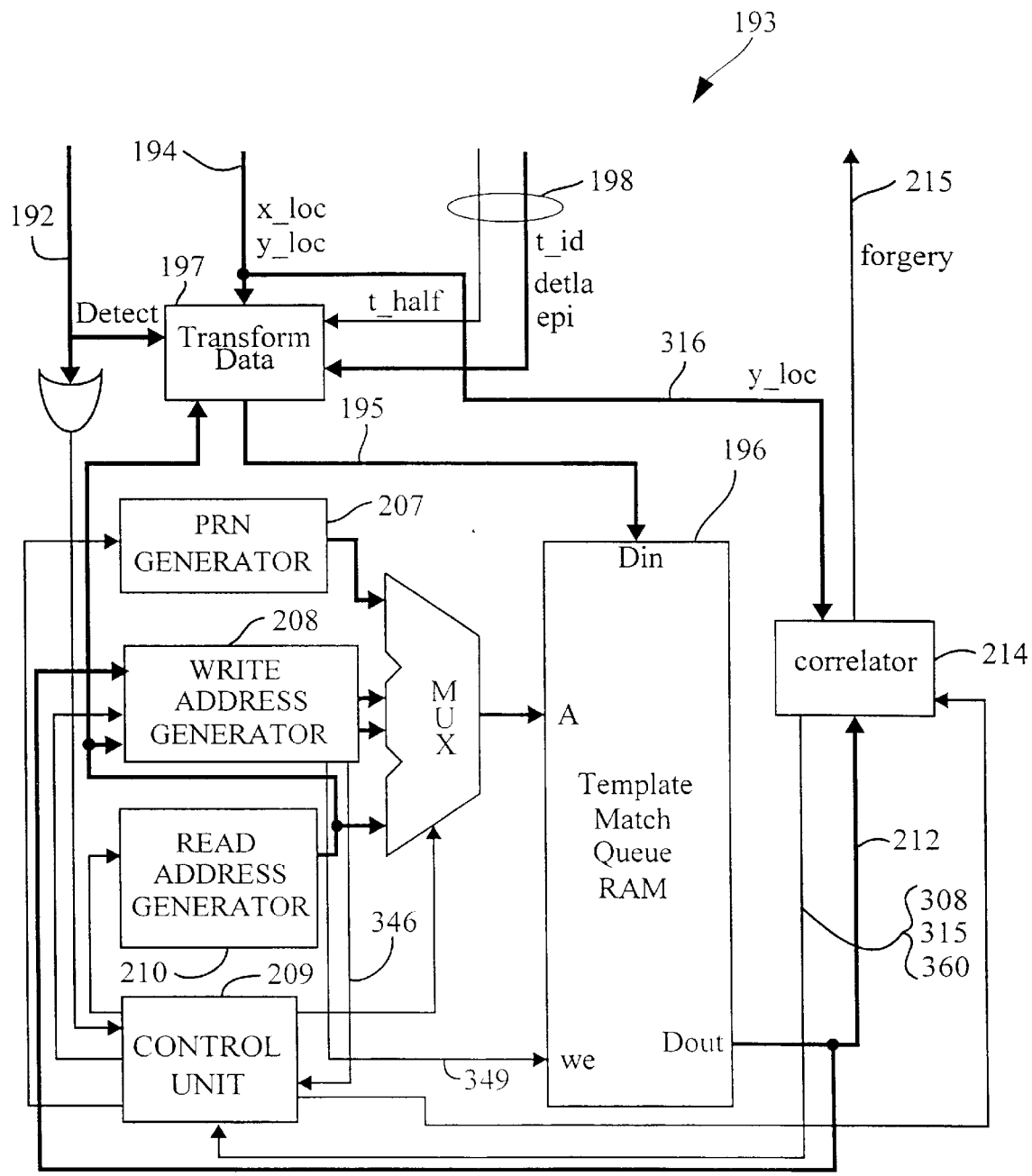
FIG. 39 is a schematic block diagram of the detection sequencer of FIG. 18.

In order for the comparator matrix 165 to simultaneously detect the 180° rotation of the template, an address remapping scheme is utilised. Turning now to FIG. 36, there is shown a portion of the comparator matrix including the first column 236. The input to the comparator matrix 165 from the phase RAM 114 consists of the phase data bus 162 which includes 36 bits of data divided into nine groups of four bits each. These nine 4 bit values correspond to the nine 4 bit values of a single column of cell data from the phase RAM 114. The output signal 238, which corresponds to the 0° rotation case, is derived form data values tapped from the bus 162 in a first order. A signal 289, which corresponds to the case of 180° rotation, is derived in the same manner as signal 238 but for the fact that the data is tapped off the phase data bus 162 in the reverse order. This corresponds to testing for a 180° rotation of the data. The signal for the 180° rotation case 289, is fed to a tally array 188 (FIG. 39). This tally array operates in the same manner as the tally array of FIG. 34 but for the fact that the opposite diagonal is detected.

Figure 37:
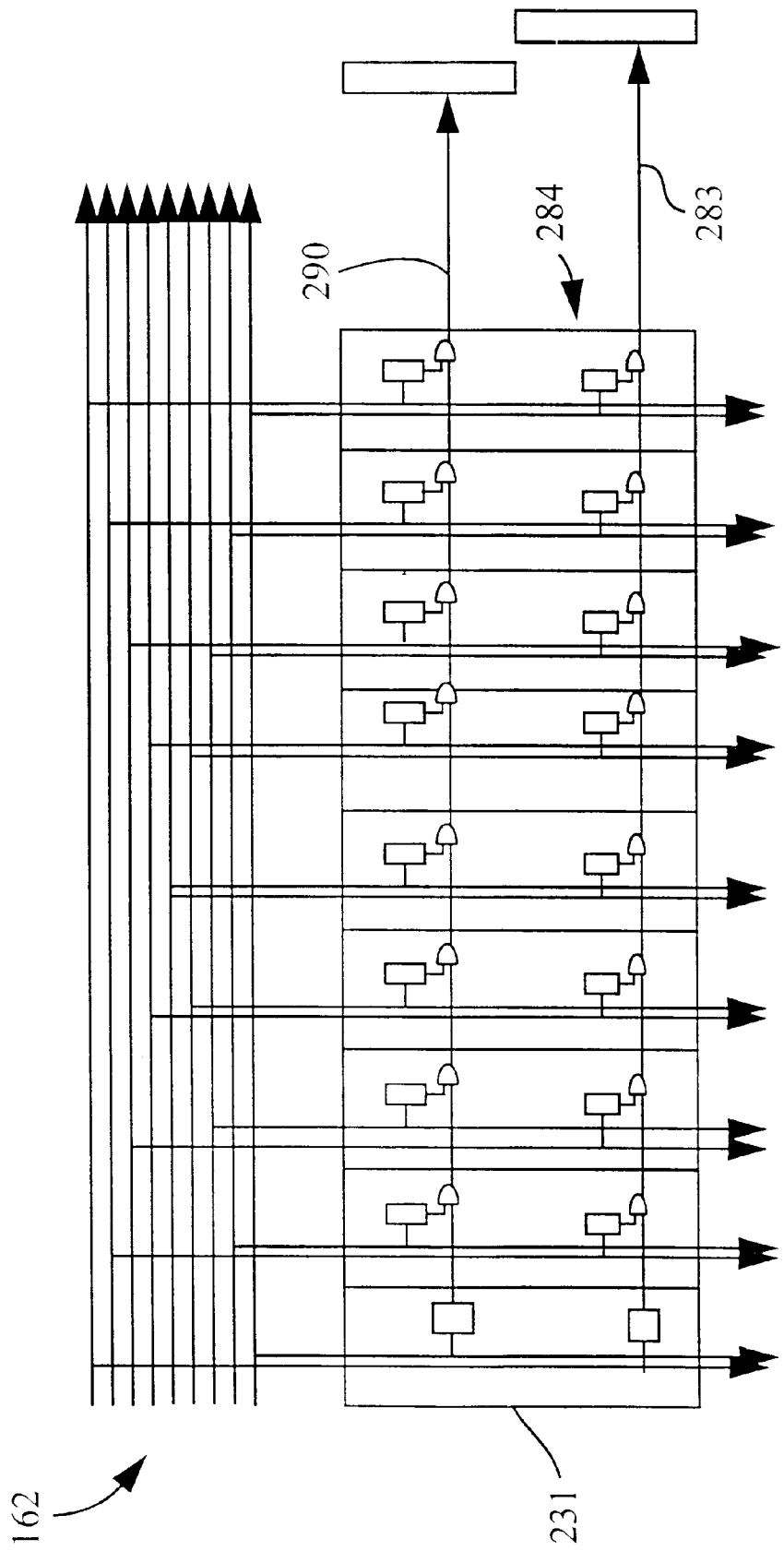
FIG. 37 illustrates the process of simultaneously determining a match for the 90° and 270° rotation of a particular column.

Referring now to FIG. 37, the 270° rotation case is formed in a similar manner to the 180° rotation case. FIG. 37 shows a row 284 of comparator cells 231. The output signal 283 for the 90° rotation case is derived from tapping the phase data but 162 in a first predetermined manner. The 270° rotation case can be derived in the same manner as the 90° rotation case except for data being tapped off the bus 162 in the reverse order.

Figure 38:
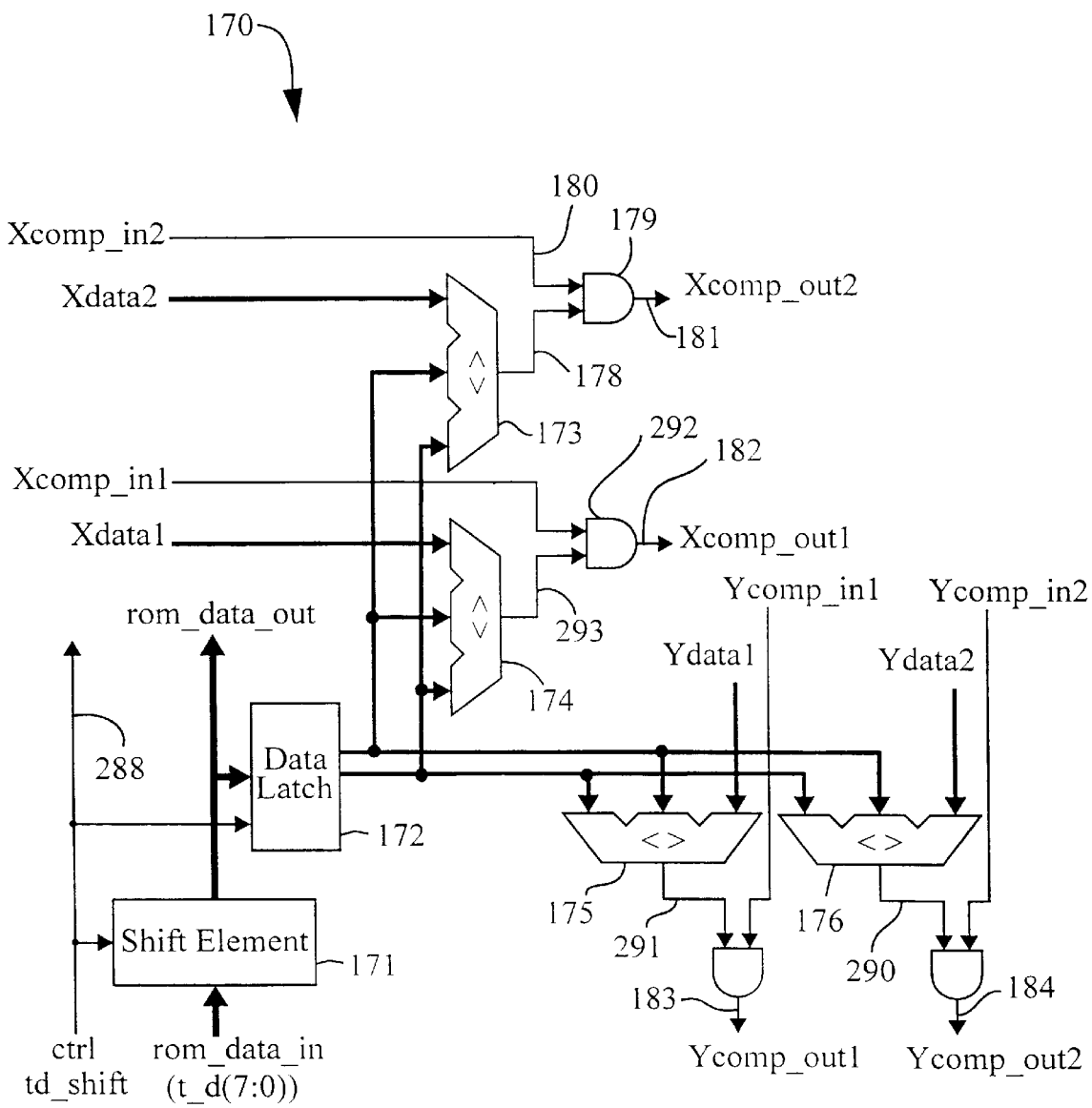
FIG. 38 is a schematic block diagram of a comparator cell of a comparator array of FIG. 27.

Referring now to FIG. 38 there is shown a single comparator cell 170 in more detail. As will be evident from the previous discussion, each comparator cell 170 will have four bus inputs corresponding to the four possible rotations of input data. These inputs are designated XDATA1, XDATA2, YDATA1, YDATA2 corresponding to the 0, 180, 90 and 270° rotation cases respectively. The external outputs of the comparator array 170 are only activated when the comparator cells 170 of an entire row or column, for a particular rotation, all detect valid cases of input data. Therefore, by way of example, input line XCOMP_IN1 represents the validation signal from a previous cell for data having the same rotation. This signal is ANDed by AND gate 292 with a signal 293 whose derivation will be explained further hereinafter. The output 182 from the AND gate 292, XCOMP_OUT1 is then forwarded to the next cell in the row.

Signals XDATA2, XCOMP_IN2 and XCOMP_OUT2 correspond to the 180° rotation case and operate in an analogous manner to the 0° rotation case. Similarly, signals YDATA1, YCOMP_IN1 and YCOMP_OUT1 correspond to the 90° rotation case and signals YDATA2, YCOMP_IN2 and YCOMP_OUT2 correspond to the 270° rotation case.

In the preferred embodiment, the template cell data is matched with incoming cell data when each portion of the cell data is within a predetermined range. Therefore, as noted previously, a template's cell data consists of two cell values which determined the boundaries of a range of values. A comparator cell 170 matches the input cell data when the cell value is within the range defined by the two range values. Therefore for each possible rotation, a range determination means 173–176 is provided. A data latch 172 is loaded with the upper and lower range value for the particular template cell. These upper and lower values are fed to each range determination means 173–176, for each possible rotation within a comparator cell 170. Also fed to the range determination means 173–176 is the particular cell data (e.g. XDATA1). Each range determination means 173–176 consists of two comparators which determine if the XDATA or YDATA value is within the range stored in data latch 172, outputting a signal 178, 293, 291, 290 respectively when this is the case. The template data, which comprises the set of two range values, is forwarded to the data latch 172 from the template ROM 15 (FIG. 2) by means of a series of shift registers 171. Data is shifted into the comparator matrix from one cell's shift register 171 to the next cell's shift register via data bus (ROM_data_in and ROM_data_out), utilising a two phase clocking scheme implemented by a control line 288. Once the template data is in position, it is forwarded to corresponding cell data latch 172.

Referring again to FIG. 27, in order to determine if a template matches with a corresponding input stream, the comparator array 165 is initially loaded 163 with range values from the template ROM 15. The cells corresponding to a portion of the input image are then forwarded on the phase database 162 from the phase RAM 114 to the comparator array 165 where they are tested simultaneously as hereinbefore described for matching with template data. Rotations of 0, 90, 180 and 270 degrees are simultaneously tested by comparator matrix 165 and tally arrays 186–189 resulting in the detection signal 192 being activated when the template matches with the incoming data 162.

In order to test other possible templates, the comparator array 165 can be reloaded with a corresponding new template from template ROM 15 and the same cell data fed from the phase RAM 114.

Turning again to FIG. 18, the four detection outputs 192 for the comparator matrix 115 are fed to a detection sequencer 193. The detection sequencer 193 determines if an image has been detected by analysing the template comparison results from the comparator matrix 115. As seen to FIG. 10, an image is determined to have been detected when a relative position vector 58 between two detected templates 55 and 54 is of an expected magnitude and direction.

Figure 40:
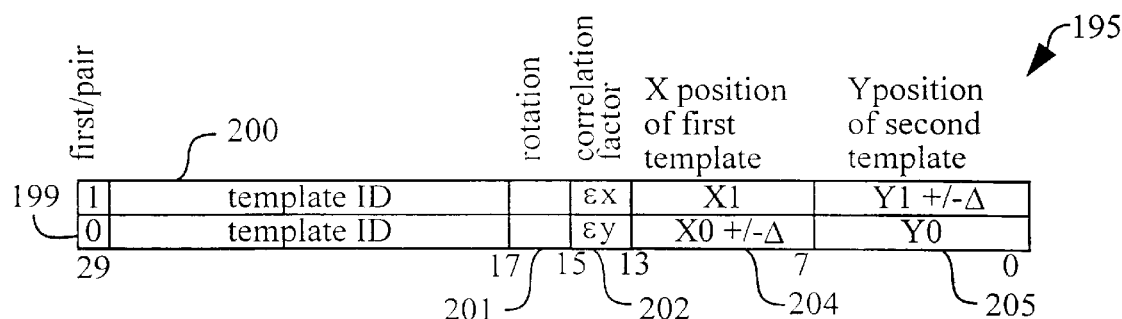
FIG. 40 illustrates the data storage format of the template matching queue of FIG. 26.

In FIG. 39 there is shown the detection sequencer 193 in more detail. The inputs to the detection sequencer 193, include the detection signals 192 from the comparator matrix 115, and x-location and y-location signals 194 that are input from the phase sequencer 113 (FIG. 25), and which indicate the location of the matched template. Other inputs include the template ROM data 198, including the template identification data, delta (Δ) values and epsilon (ε) values. This data is fed to a transform data unit 197 which is responsible for outputting transformed data in accordance with Table 3 below (to be described). When the detection signal 192 is activated, the template identification number, location and orientation of the matched template are read from the template ROM 15, via the transform data unit 197, and via a bus 195 are stored in a template match queue 196. Each entry in the template match queue 196 is 32 bits wide and a maximum of 128 entries can be stored in template match queue 196. FIG. 40 illustrates the data format of two entries 195 of the template match queue 196. Each of these data entries 195 contains a number of fields. A first field 199 is either 0 or 1 depending on which of a pair of templates it corresponds to. A second template identification 200 stores the image number to which the template belongs and is followed by a field 201 corresponding to the rotation of the template. A correlation factor, ε is also saved for one of the two dimensions εx or εy 202. One of the correlation factors is saved with each entry of the queue and is utilised in determining how much the relative vector 58 of FIG. 10 can change.

Figure 41:
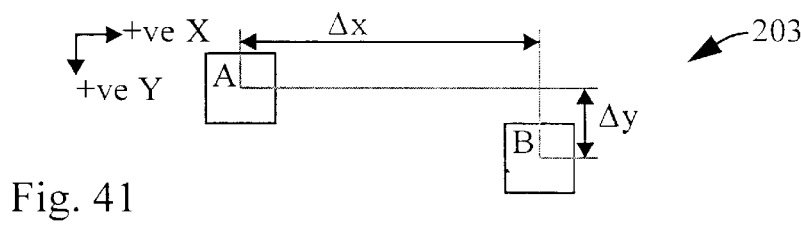
FIG. 41 illustrates the definition of the distance between two templates.
Figures 42A, 42B:
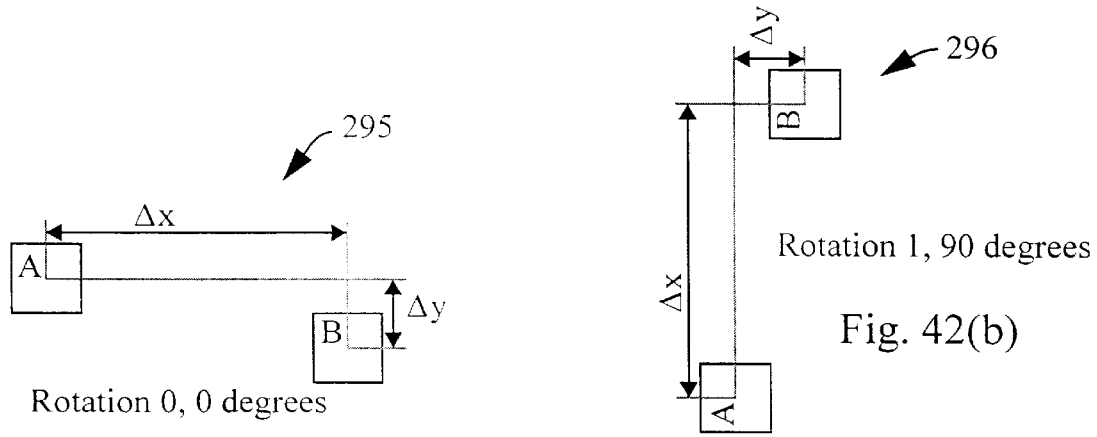
FIG. 42(*a*) to (*d*) illustrates a number of possible rotations of two templates.
Figures 42C, 42D:
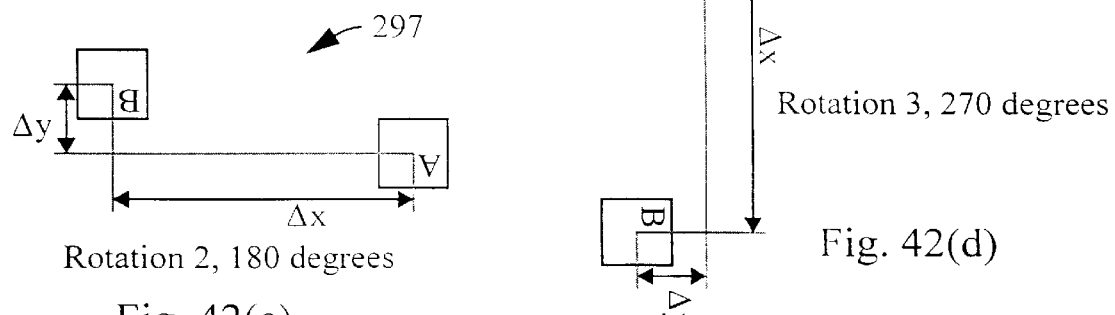

Referring now to FIG. 41, there is shown the format for measuring between two templates A and B. The values Δx and Δy are derived from the expected horizontal and vertical offsets respectively. In FIGS. 42a to 42d, there is shown the template pair definition 295 which corresponds to a zero degree rotation, in addition to a 90 degree rotation 296, a 180 degree rotation 297 and a 270 degree rotation 198 respectively.

Upon the detection of a template, the transform data unit 197 of the detection sequencer 193 calculates the required x and y position values of the detected templates mate in accordance with Table 3 below. As can be seen from Table 3, fi the template detected is nearer to the top of the page than its mate, then the expected vertical position of its mate is calculated and stored with its own horizontal position. If the template detected is nearest the bottom of the page, the opposite is done and the expected horizontal position of its mate is calculated and stored with it sown vertical position.

TABLE 3

| Half | Rotation | First | Epi | X Position | Y Position |
| --- | --- | --- | --- | --- | --- |
| A | 0 | 1 | εx | $X_A$ | $Y_A + \Delta y$ |
| B | 0 | 0 | εy | $X_B - \Delta x$ | $Y_B$ |
| A | 90 | 0 | εy | $X_A + \Delta y$ | $Y_A$ |
| B | 90 | 1 | εx | $X_B$ | $Y_B + \Delta x$ |
| A | 180 | 0 | εy | $X_A - \Delta x$ | $Y_A$ |
| B | 180 | 1 | εx | $X_B$ | $Y_B + \Delta y$ |
| A | 270 | 1 | εx | $X_A$ | $Y_A + \Delta x$ |
| B | 270 | 0 | εy | $X_B + \Delta y$ | $Y_B$ |

It can be seen from the above table that both entries for the first and second half of the template wills tore the vertical location of the template furthest down the page for each rotation. Therefore, once the current line number being processed by the comparator matrix 115 is incremented to an extent sufficient to exceed by an appropriate margin the position stored within the template entry 195, the template entry can be removed form the template match queue 196.

At the start of the printing of a new page, the template match queue RAM 196 is reset. This means that all the entries in the queue are deleted, leaving the queue empty. A pseudo "C" code description of this action is as follows:

```
if (first == 1 || reset == 1) {
    for (read_addr = 0; read_addr < MAXADDR+1; read_addr ++) {
        delete (read_addr);
    }
}
```

When a detection signal 192 is received form the comparator matrix 115, an "add template" mode is entered. The transform data unit 197 is responsible for transforming its inputs 194, 198 to the correct format as shown in FIG. 40. This data 195 is then stored in the template match queue RAM 196 at the next available location. This can be achieved by the utilisation of a linked list by utilising the bits 0 to 7 of each empty entry 198 of the template match queue to be a pointer in a list. Therefore, detected template entries can be added to the queue by forming a link list structure.

With most images, it will be rare for many templates to be found. However, if more than 128 template matches occur the template match queue 196 will be full. It has been found that, with a full queue, the best strategy is to discard entries on a pseudo random basis rather than the normal first-in/first-out basis. Therefore, a pseudo random number (PRN) generator 207 is provided for randomly determining a queue entry to be deleted. In situations where the queue is not full, a write address generator 208 determines the next queue position for writing entries into the template match queue 196. A pseudo "C" code representation of the "add template" mode is as follows:

```
while (1) {
    wait on detect != 0);
    if (!full) {
        next_addr = TMQ(write_addr) & 0xff;
        TMQ(write_addr) = Xfrom(inputs);
        if (write_addr == end_addr) {
            full = true;
        } else {
            write_addr = next_addr;
        }
    } else {
        TMQ(prn_addr) = Xfrom(inputs);
    }
}
```

Turning again to FIG. 39, when not adding new entries to the template queue 196, a control unit 209 causes the detection sequencer 193 to otherwise continuously cycle through the template match queue 196 looking for pairs of templates that correlate closely enough in position to indicate that an image has been found. The control unit 209 continuously causes a read address generator 210 to read entries from the template match queue 196.

A correlator 214 takes two sets of data, A and B, and compares their relative identification fields in accordance with Table 4 below:

TABLE 4

| ID field | bits | correlation function for locations A and B |
| --- | --- | --- |
| pair | 1 | A ≠ B |
| face | 8 | A = B |
| rotation | 4 | A = B |
| orientation | 2 | A = B |
| xposition | 6 | \|A − B\| ≤ εx |
| yposition | 7 | \|A − B\| ≤ εy |

If all the correlation functions match, an image detected signal 215 is output from correlator 214 and forwarded to a configuration and control unit 217 of FIG. 18. The configuration and control unit 217 (FIG. 18) in turn signals the gamma correction unit 86 to blank out all further data and notifies the sequencer controller 12 (FIG. 2) that an image has been detected.

The control unit 209 performs the template match searching process by utilisation of two modes, firstly a "Find Base" mode and, secondly a "Find Mate" mode. The Find Base mode includes the searching of the template matching queue for a suitable base template. The following pseudo "C" code describes this mode;

```
{
    load_base = 0;
    for (read_addr = 0; read_addr < MAXADDR+1 &&!load_base;
                read_addr ++) {
        if (Q.first == 0 && (y_loc > Q.y_pos + Q.epi| | end) &&
    valid(Q.t_id)) {
            load_base = 1;
        }
        if (Q.first == 1 && y_loc > Q.y_pos + 3 && valid(Q.t_id)) {
            delete(read_addr);
        }
    }
    if(load_base == 1) {
        base = (Q.t_id, Q.y_pos, Q.epi, Q.x_pos, Q.rot);
        load_base = 0;
        do {find_mate( );}
    }
} do always;
```

It should be noted that the above code contains two subroutine calls, the first being "delete" and the second being "find_mate". The delete function can be described by the following pseudo "C" code which sets the last address bits and adds the entry to a linked list.

```
TMQ(read_addr).t_id = 0xfff;
if (!full) {
    TMQ(end_addr).next = read_addr;
} else {
    write_addr = read_addr;
    full = false;
}
end_addr = read_addr;
```

The find_mate function searches for a mate of a previously found base template. This is achieved by searching through the queue to determine if the conditions as outlined in Table 4 have been met. A pseudo "C" representation of this function or mode is as follows:

```
forgery = 0;
for (read_addr = 0; read_addr < MAXADDR+1; read_addr ++){
    if (first == 1 && abs(y_pos - base.y_pos) <= base.epi
        && abs (Q.x_pos - base.x_pos) <= Q.epi && Q.rot == base.rot &&
            Q.t_id == base.t_id){
            forgery = 1;
    }
    if (Q.first) == 0 && Q.y_pos == base.y_pos &&
        Q.x_pos == base.x_pos && Q.t_id == base.t_id) {
            delete(read_addr);
    }
}
```

Figure 43:
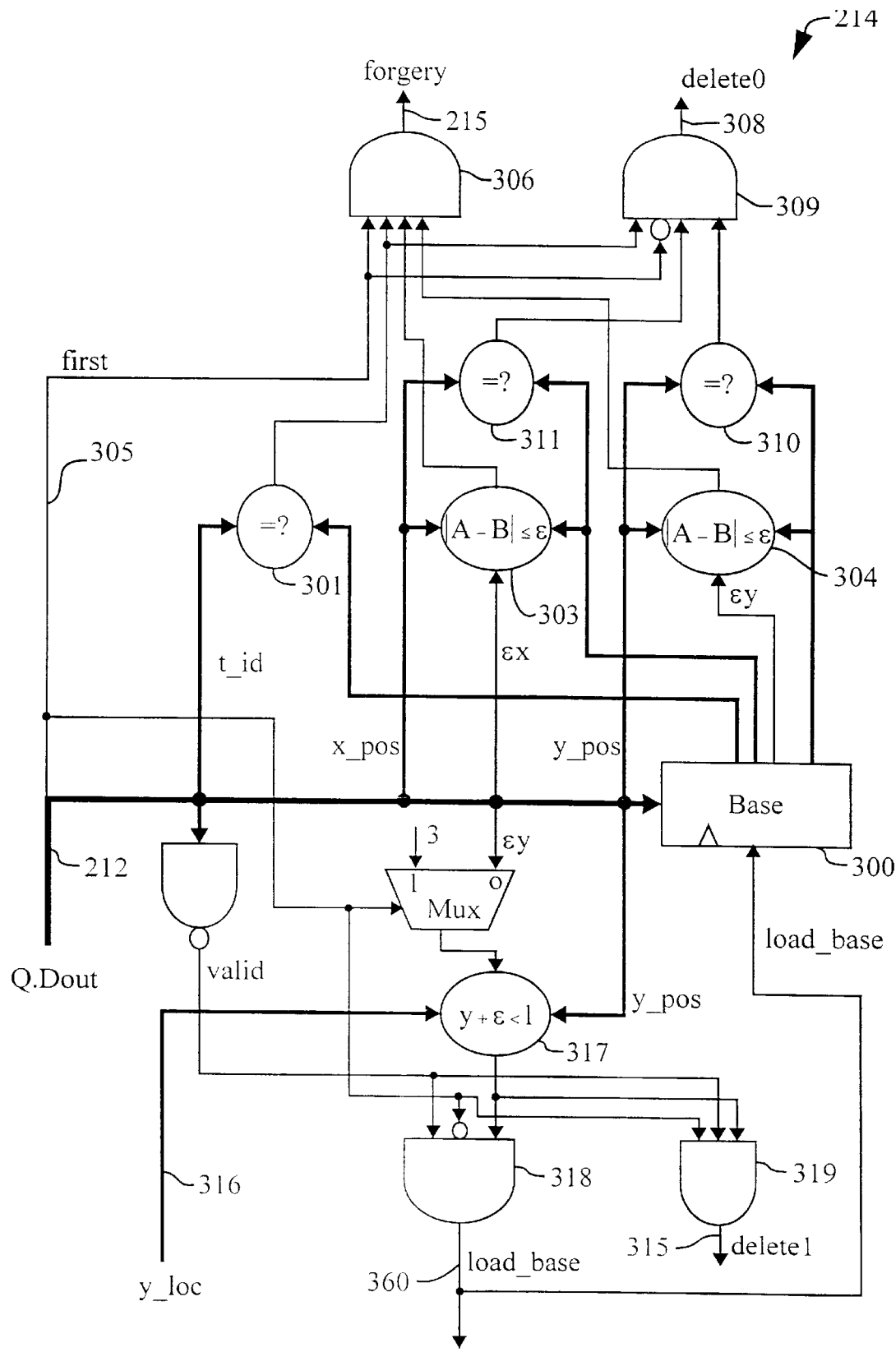
FIG. 43 is a schematic block diagram of the correlator of FIG. 39.

Referring now to FIG. 43, the correlator 214 of FIG. 39 is illustrated in more detail. The correlator 214, in conjunction with the control unit 217, is responsible for implementing the methods as outlined by the above pseudo "C" code for the Find Base mode, the Find Mate mode and the delete function for deleting entries from the template match queue 196 (FIG. 39), in addition to determining when an entry should be deleted from the template match queue 196.

The template data entry for the first candidate match is fed from the template match queue 196 (FIG. 39) to a latch 300 via a bus 212. The second candidate entry is then fed from the template match queue 196 to the correlator 214 via the bus 212. An equality comparator 301 tests for equality of the face, rotation and orientation data from the two entries, the first being stored in latch 300 and the second forwarded via data lines 212. The output of the equality comparator 301 is forwarded to AND gates 306, 309.

If the first queue entry, stored in the latch 300, is denoted A and the second queue entry forwarded via queue data bus 212 is denoted B, then a relational tester 303 tests whether |A–B|≦εx and a relational comparator 304 tests for the relationship |A–B|≦εy. The outputs from the equality comparator 301, and the relational comparators 303 and 304, in addition to a pair indicator line 305, which indicates whether the template on data lines 212 is the first or the second of an expected pair, are fed together to the AND gate 306 which outputs a forgery detection signal 215 when all its inputs are high.

A template match queue deletion signal 308, denoted delete0, is activated when the same entry is detected twice. The delete0 signal 308 is derived via the AND gate 309 whose inputs are equivalent to those mentioned in the second conditional statement in the above pseudo "C" code describing the operation of Find Mate mode. They comprise: (i) an output from an equality tester 310 which tests for equality of y axis position location of the two template A, B, (ii) a second equality comparator 311 which tests for equality of x position, and (iii) a third signal which is derived form the negation of the signal 305 indicating the first or second pair member. The fourth signal to the AND gate 309 is the output from equality comparator 301 which tests for equality of the face, rotation and orientation information of the two input entries A, B.

A second template matching queue deletion signal 315, denoted delete1, is activated when it is no longer possible for a template within the template matching queue to match with any other template due to the fact that the current y address, input in the form of signal 316 is greater than the expected y address of the second matching template plus the εy factor. A relational comparator 317 tests for this condition with its output forming one of the inputs to an AND gate 319. Hence, the AND gate 319 implements the conditional statement as expressed by the second conditional of the above mentioned pseudo "C" code description of the Find Base mode.

Figure 44:
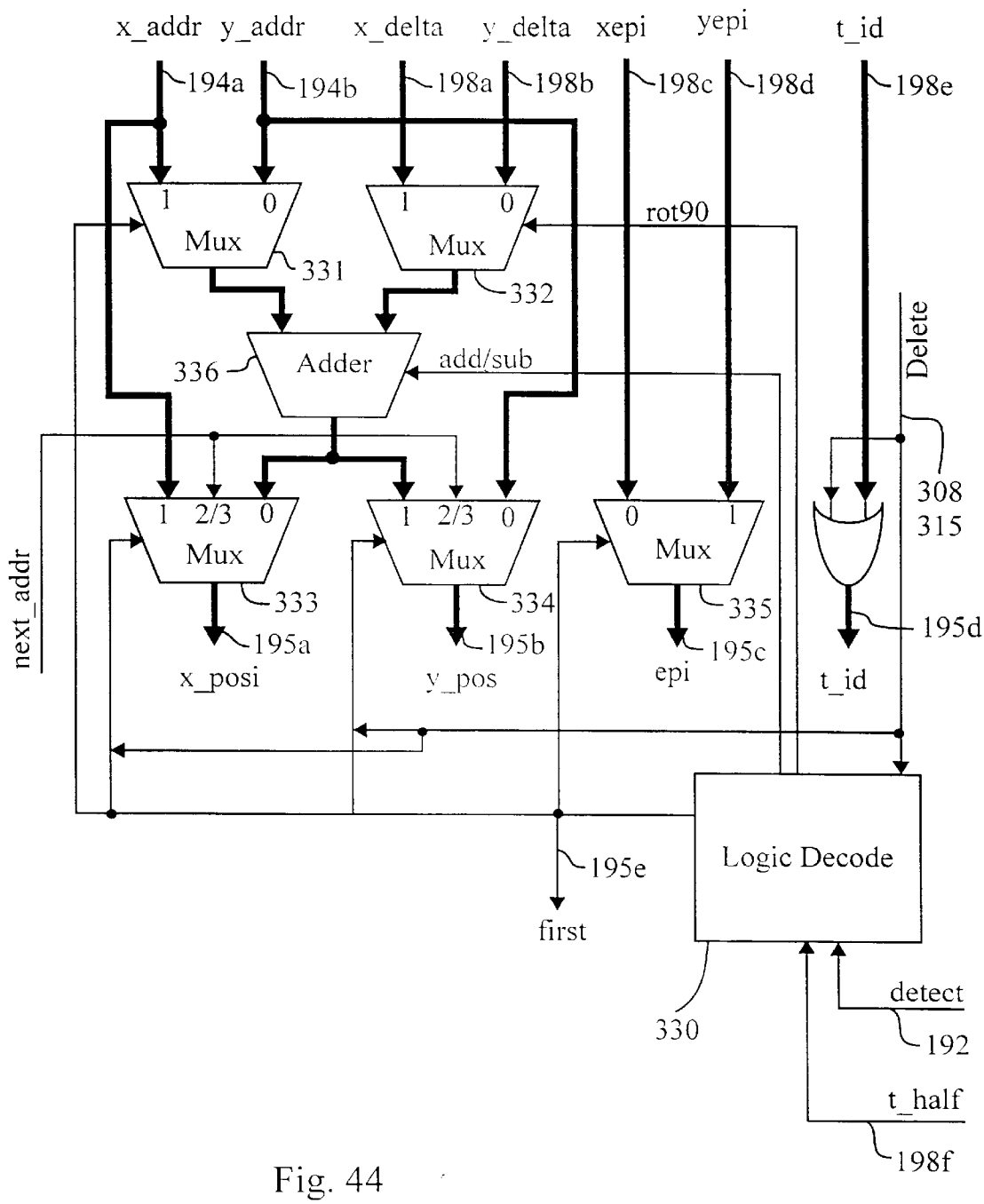
FIG. 44 is a schematic block diagram of the transform data unit of FIG. 39.

Referring now to FIG. 44, there is shown the transform data unit 197 in more detail. The transform data unit 197 acts under the control of a logic decode state machine 330 which is utilised to control various multiplexers 331–335 in addition to adder AN 336. As noted previously, inputs to the transform data unit 197 include a current x and y address 194a, 194b from the phase sequencer 113, in addition to Δx, Δy, εx, εy and template identification data 198a–198e. The output data comprises x position and y position values 195a and 195b, calculated in accordance with Table 3, in addition to an ε value 195c, template identification data 195d and a pair indicator 195e. Additional inputs include a pair indicator 198f and a detection signal 192 from the tally arrays 186–189.

By way of example, the x position value 195a of Table 3 is generated simply through a combining multiplexer 331 and multiplexer 332 to input x address 194a and Δx 198a to adder 336. The output is fed to multiplexer 333. Also fed to multiplexer 333 is x address 194a. Multiplexer 333 chooses between the two possible addresses under the control of decode logic 330 to output x position 195a. The logic decoder 330 is responsible for choosing the appropriate control signals for the multiplexers 331, 332, 333 and the adder 336. The output signal 195b is derived in a similar manner to the signal 195a. The multiplexer 335 is utilised under the control of logic decoder 330 to decide whether the value of εx or εy should be output on output 195c. Output 195d is derived by adding the queue deletion signals 308, 315 to the template ID information 198e to form new template ID information 195d.

Turning again to FIG. 39, the pseudo random number generator 207 is utilised to generate addresses into the template match queue RAM 196 once the queue becomes full. The pseudo random number generator 207 can be implemented using a number of known methods. For example, one form of implementation is utilising a free running 15 bit linear feedback shift register, with the feedback being the exclusive NOR of the two most significant bits and a two bit linear feed back shift register. This produces a $2^{15}-1$ long sequence of pseudo random numbers which can be utilised to generate six bits of a pseudo random address and a counter for the two most significant bits of the address.

The write address generator 208 of FIG. 39 generates the next address to write entries to when a template detect signal arrives from the comparator matrix 115. the write address generator follows a linked list of deleted queue entries and on a write cycle, the location to be written is first read to extract the next write address. Therefore, the write address generator 208, in conjunction with the control unit 209 implements the portion of the above pseudo "C" code associated with the add template mode as previously described.

Figure 45:
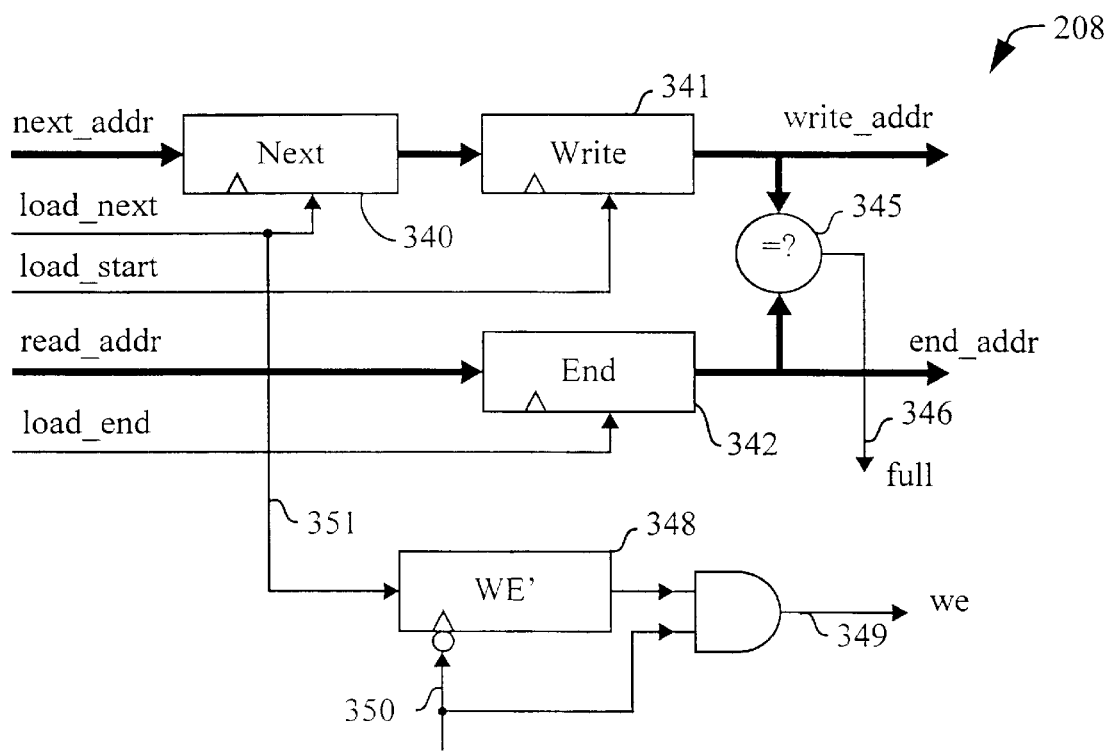
FIG. 45 is a schematic block diagram of the write address generator of FIG. 39.

In FIG. 45, there is shown the write address generator 208 in more detail. The write address generator includes two latches 340, 341 which are utilised in following the linked list chain. The input to the first latch 340 is the last read value out of the template match queue 196. The address of the last entry in the linked list is latched in latch 342. An equality comparator 345 compares the current address node stored in latch 341 with the last address node stored in latch 342 and produces an output 346 which is high when the two latches addresses are equal and the queue is full. A write enable signal 349 is output to the template match queue RAM for writing addresses to the template match queue RAM 196. The write enable signal 349 is derived from latch 348 under the control of a control signal 350 from the control unit 209. The latch 348, latches the load next signal 351 from the previous link in the link list, the load next signal 351 being derived from the control unit 209.

Figure 46:
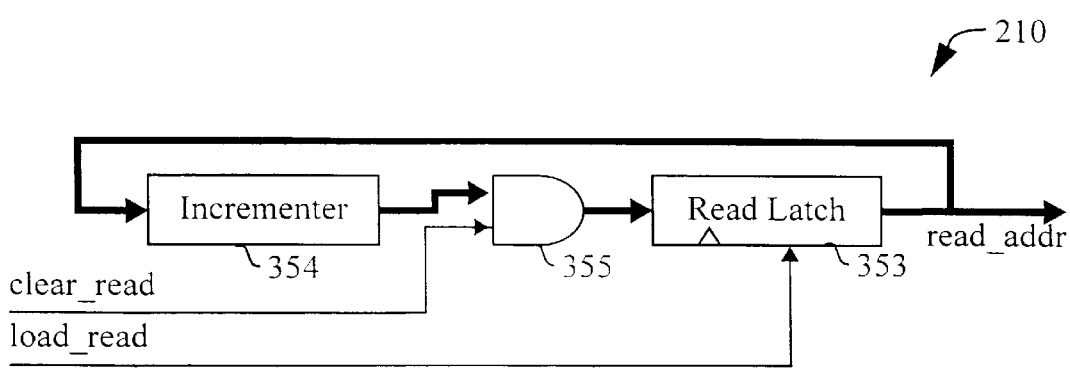
FIG. 46 is a schematic block diagram of the read address generator of FIG. 39.

Referring again to FIG. 39, the read address generator 210 generates the addresses for reading the queue during the scan to find match template pairs. In FIG. 46, there is shown the read address generator 210 in more detail. The read address generator merely implements the two "for loops" as previously described in the pseudo "C" code outlined above with respect to the Find Base mode and the Find Mate mode. Hence, the read address generator 210 consists merely of a read latch 353 for holding the current read address and an incrementor 354 for incrementing the address, in addition to AND gate 355. The read address generator operates under the control of a clear_read and a load_read signal form the control unit 209.

In the design of the detection module 14, a number of cost verses performance trade-off decisions can be made. The performance of the detection module 14 can be measured in terms of the number of separate images which it can recognize. Factors limiting this number include:

1. The clock frequency of operation of the detection module 14, which will determine how many comparisons can be made for each incoming set of video pixel data. The required frequency of the clock $C_f$ in the preferred embodiment is given by the following equation:

$$C_f 8\pi T f m^3 / p(p-m)n \qquad (1)$$

2. The access time of the ROM 15 determines how many images can be fetched for comparison for each incoming set of video pixel data. The ROM data band width $R_f$ of the preferred embodiment is given by the following equation:

$$R_f = \pi T f m^4 W / 2 s (p-m) w \qquad (2)$$

The variables set out in the above equations are defined as follows: T=number of bank note templates f=input video pixel data rate m=size of the comparator matrix in blocks=9 p=size of the comparator matrix in pixels= 1152 n=number of comparators in each element of the comparator matrix=4 W=width in bits of each piece of template data=8 x=scan line length=5100 w=width in bits of the ROM interface=16

So, with the above numbers, equation (1) becomes:

$$C_f = 13.76 \times 10^{-3} T f / n$$

and equation (2) becomes:

$$R_f = 8.77 \times 10^{-4} T f$$

giving the required access time of the ROM as:

$$R_t = 1140/(Tf)$$

which also gives:

$$C_f = 15.7 R_f / n$$

The table below illustrates various operating frequency and ROM access times for differing values of T and f.

| f | T | $C_f$ | $R_t$ |
|---|---|---|---|
| 22.5 MHz | 128 | 9.92 MHz | 400 ns |
| 22.5 MHz | 256 | 19.84 MHz | 200 ns |
| 22.5 MHz | 512 | 39.68 MHz | 100 ns |
| 16.8 MHz | 128 | 7.41 MHz | 530 ns |
| 16.8 MHz | 256 | 14.82 MHz | 265 ns |

Ideally, the second entry in the above table, where 256 templates T are available is chosen. The required clock frequency will then be 19.84 MHz and the input clock frequency will be 22.5 MHz. This raises the desirable possibility that the fundamental clock $C_f$ of detection module 14 can be run directly from the clock of the overall copier system 4, if the frequency of the copier system 4 is 22.5 MHz.

The present invention can be used for various apparatus, such as an image scanner, a printer, a copying machine, a computer. Such apparatus controls process functions of the apparatus, such as an image data processing, an image forming processing, based on the discrimination result of the specific image.

The above description describes only one embodiment of the present invention and modifications, obvious to those skilled in the art, can be made thereto without departing from the scope of the invention. For example, an alternative embodiment that merely detects the presence of a template is likely to have a restricted utility but still be partially functional. Additionally, the sizes of various cells and templates can be altered where different requirements arise.

We claim:

1. Apparatus for the detection of an image in an input pixel stream, said apparatus comprising:
   (i) image input means for receiving said input pixel stream;
   (ii) cell converter means for forming cell data portions formed from regions of a corresponding image of said input pixel stream;
   (iii) template storage means for storing at least one template, said template comprising a multiplicity of cell data entries derived from the desired image to be detected, wherein each cell data entry constitutes a range of values, said range of values being derived from maximum and minimum data entry values for a particular corresponding portion of said desired image when said particular corresponding portion of said desired image is subjected to a predetermined amount of rotation, scaling and translation or any combination thereof; and
   (iv) comparator means for comparing said cell data portions of said cell converter means with said multiplicity of cell data entries to derive a template detection signal when at least an adjacent pair of said cell data portions match with a corresponding pair of said cell data entries for an optimal rotation position of said adjacent pair of cell data portions, and wherein said comparator means simultaneously compares a column of said cell data portions with said cell data entries of said template to determine if any column of said template matches with said column of cell data portions.

2. Apparatus as claimed in claim 1, wherein said multiplicity of cell data entries comprises all said cell data entries within said template.

3. Apparatus as claimed in claim 1, wherein said cell data portions must occur within said range in order to provide the desired match.

4. Apparatus as claimed in claim 1, wherein said comparator means simultaneously compares a column of said cell data portions with the whole of said cell data entries of said template to determine if any column of said template matches with said column of cell data portions.

5. Apparatus as claimed in claim 4, wherein said comparator means simultaneously compares a 180 degree rotation of said column of cell data portions with the whole of said template to determine if any column of said template matches with said rotated column of cell data portions.

6. Apparatus as claimed in claim 1, wherein said comparator means simultaneously compares a column of said cell data portions with the whole of said template to determine if any column of said template matches with a column of a 90 degree rotation of said columns of said template.

7. Apparatus as claimed in claim 4, 5 or 6, wherein said comparator means simultaneously compares a column of said cell data portions with the whole of said template to determine if any column of said template matches with a column of a 270 degree rotation of said columns of said template.

8. Apparatus as claimed in claim 1 wherein said template storage means contains multiple templates and said comparator means carries out a comparison for each one of said templates.

9. Apparatus as claimed in claim 1 wherein said comparator means loads a subsequent template while simultaneously carrying out said comparisons of said cell data portions of said cell converter means with said multiplicity of cell data entries.

10. Apparatus for the detection of an image in an input pixel stream, said apparatus comprising:

(i) image input means for receiving said input pixel stream;

(ii) cell converter means for forming cell data portions from overlapping regions of said pixel stream, said cell data portions being divided into a series of phases with each of said phases having cell data portions derived from non-overlapping regions;

(iii) template storage means for storing at least one template, said template comprising a multiplicity of cell data entries derived from a desired image to be detected, wherein each cell data entry constitutes a range of values, said range of values being derived from maximum and minimum data entry values for a particular corresponding portion of said desired image when said particular corresponding portion of said desired image is subjected to a predetermined amount of rotation, scaling and translation or any combination thereof; and (iv) comparator means for comparing said cell data of each of said series of phases of said cell converter means with said multiplicity of cell data entries to derive a template detection signal when at least an adjacent pair of said cell data portions match with a corresponding pair of said cell data entries for an optimal rotation position of said adjacent pair of cell data portions, wherein said comparator means simultaneously compares a column of said cell data portions with said cell data entries of said template to determine if any column of said template matches with said column of cell data portions.

11. Apparatus as claimed in claim 10, further comprising:

(v) detected template storage means for storage of a plurality of template entries, with each said template entry including detected location data corresponding to a location of the template detected by said template detection signal; and (vi) dual template detection means for detecting an occurrence of two templates from the same image in said pixel stream.

12. Apparatus as claimed in claim 11, wherein said dual template detection means includes distance determination means for determining the distance between the detected location data of said detected templates.

13. Apparatus as claimed in claim 12, wherein said distance determination means includes distance comparator means for determining if said distance between the detected location data is substantially the same as an expected predetermined distance between said detected templates.

14. Apparatus as claimed in claim 10, wherein said cell data portions include a data value derived form a group of pixels, said pixels covering a two-dimensional area of said image.

15. Apparatus as claimed in claim 14, wherein said cell converter means forms multiple sets of said cell data portions, with each set of said cell data portions being composed from a contiguous two dimensional area of pixels in the input pixel stream.

16. Apparatus as claimed in claim 12 or 13, wherein said distance is a vector measure having magnitude and directional components.

17. Apparatus for comparing a first predetermined array of cell data values with a second predetermined array of template data values, said apparatus comprising:

(i) input means for inputting, a column at a time, said first predetermined array of cell data values to a comparator matrix means;

(ii) a comparator matrix means for simultaneously determining if said column of cell data values matches with any of a plurality of columns of said second predetermined array of template data values and producing a column matching signal designating the said matched column of said second predetermined array of template data values, said comparator matrix means for simultaneously determining if said column of cell data values matches with any of a plurality of columns of a predetermined number of rotations of said second predetermined array of template data values and producing a rotated column matching signal designating said matched column of said predetermined number of rotations of said second predetermined array of template data values, wherein said column of cell data values is simultaneously input to said comparator matrix means in a first order corresponding to a first rotation case and in a second order corresponding to a second rotation case;

(iii) tally array means for storing said column matching signals for a series of columns of said first predetermined array of cell data values; and (iv) template match detection means for deriving from said stored column matching signals, a template match signal signifying the occurrence of a match between said template and a portion of said first predetermined array of cell data values.

18. Apparatus as claimed in claim 17, wherein:

said tally array further includes means for storing said rotated column matching signals for a series of columns of said first predetermined array of cell data values; and said template match detection means further includes means to derive, from said stored rotated column matching signals, a template match signal signifying the occurrence of a match between a rotation of said template and a portion of said first predetermined array of cell data values.

19. Apparatus as claimed in claim 18 wherein said rotations include substantially 90, 180 and 270 degrees.

20. Apparatus as claimed in claim 17, wherein:

said comparator matrix means simultaneously determines if said column of cell data values matches with any of a plurality of rows of said second predetermined array of template data values and produces a row matching signal designating the said matched row of said second predetermined array of template data values; said apparatus further comprising:

second tally array means for storing said row matching signals for a series of columns of said first predetermined array of cell data values, and second template match detection means for deriving from said stored row matching signals, a second template match signal signifying the occurrence of a match between said template and a portion of said first predetermined array of cell data values.

21. Apparatus as claimed in claim 17 wherein the number of elements of said column of cell data values is the same as the number of values in said column of said second predetermined array of template data values.

22. Apparatus as claimed in claim 17 or 18, wherein a template data value comprises two numbers which delimit a range of values, and wherein a column of cell data values matches a corresponding column of said template data values when each of said cell data values is within the range delimited by said template data value.

23. An image processing method comprising the steps of:

inputting image data representing an input image;

forming cell data portions from a plurality of regions of said input image;

forming cell data portions from a plurality of regions of a specific image;

determining a representative value for each of said cell data portions of said specific image;

determining a range of representative values for each of said cell data portions of said specific image, said range being derived from the maximum and minimum representative values for a particular cell data portion when said plurality of regions of said specific image is subjected to a predetermined amount of rotation, scaling and translation or any combination thereof;

determining whether a first cell data portion of said input image includes an average data value, for said first cell data portion, within said range of representative values for a corresponding cell data portion of said specific image and generating a first determination result;

determining whether a second cell data portion of said input image includes an averaged data value, for said second cell data portion, within said range of representative values for a corresponding cell data portion of said specific image and generating a second determination result; and discriminating whether the input image includes the specific image based on the first and second determination results and positional information about the first and second cell data portions of said input image, wherein at least an adjacent pair of cell data portions of said input image returns an overall maximum determination result for an optimal rotation position of said plurality of regions of said specific image.

24. A method according to claim 23, wherein the image data is colour component data which is used for forming a colour image.

25. A method according to claim 24, wherein the colour component data is selected one of Cyan, Magenta, Yellow and Black.

26. A method according to claim 23, further comprising the step of performing density conversion on the image data before the determinations.

27. A method according to claim 23, wherein said discrimination is performed in synchronism with the input of said image data.

28. A method according to claim 23, wherein said regions of said specific image correspond to N×M pixel block.

29. A method according to claim 23, wherein said positional information includes distance information and direction information.

30. A method according to claim 23, further comprising the step of controlling an image processing apparatus based on the discrimination result.

31. An image processing method comprising the steps of:

inputting image data representing an input image;

forming cell data portions formed from a plurality of regions of a specific image;

determining a range of representative values for each of said cell data portions of said specific image, said range being derived form the maximum and minimum representative values for a particular cell data portion when said plurality of regions of said specific image is subjected to a predetermined amount of rotation, scaling and translation or any combination thereof;

extracting cell data values for each of a plurality of cells corresponding to a first region of the input image; and discriminating whether the input image includes a specific image by comparing the extracted cell data values with a range of representative values for each of a plurality of cell data portions corresponding to a second region of the specific image, wherein a column of cell data values is simultaneously compared with the cell portions of said specific image to determine if any column of said cell data portions matches with said column of cell data values, wherein at least an adjacent pair of cell data values of said input image returns an overall maximum determination result for an optimal rotation position of said plurality of cell data portions of said specific image, and wherein the discrimination is performed by compensating a minute aberration between the first region of the input image and the second region of the specific image.

32. A method according to claim 31, wherein the image data is colour component data which is used for forming a colour image.

33. A method according to claim 32, wherein the colour component data is selected one of Cyan, Magenta, Yellow and Black.

34. A method according to claim 31, wherein said discrimination is performed in synchronism with the input of said image data.

35. A method according to claim 31, wherein said minute aberration is smaller than a size of the cell.

36. A method according to claim 31, further comprising the step of controlling an image processing apparatus based on the discrimination result.

37. A computer program product comprising a computer readable medium having a computer program recorded therein for performing an image processing method comprising the steps of:

inputting image data representing an input image;

forming cell data portions from a plurality of regions of said input image;

forming cell data portions from a plurality of regions of a specific image;

determining a representative value for each of said cell data portions of said specific image;

determining a range of representative values for each of said cell data portions of said specific image, said range being derived from the maximum and minimum representative values for a particular cell data portion when said plurality of regions of said specific image is subjected to a predetermined amount of rotation, scaling and translation or any combination thereof;

determining whether a first cell data portion of said input image includes an averaged data value, for said first cell data portion, within said range of representative values for a corresponding cell data portion of said specific image and generating a first determination result;

determining whether a second cell data portion of said input image includes an averaged data value, for said second cell data portion, within said range of representative values for a corresponding cell data portion of said specific image and generating a second determination result; and discriminating whether the input image includes the specific image based on the first and second determination results and positional information about the first and second cell data portions of said input image, wherein at least an adjacent pair of cell data portions of said input image returns an overall maximum determination result for an optimal rotation position of said plurality of regions of said specific image.

38. A computer program product comprising a computer readable medium having a computer program recorded therein for performing an image processing method comprising the steps of:

inputting image data representing an input image;

forming cell data portions from a plurality of regions of a specific image;

determining a range of representative values for each of said cell data portions of said specific image, said range being derived from the maximum and minimum representative values for a particular cell data portion when said plurality of regions of said specific image is subjected to a predetermined amount of rotation, scaling and translation or any combination thereof;

extracting cell data values for each of a plurality of cells corresponding to a first region of the input image; and discriminating whether the input image includes a specific image by comparing the extracted cell data values with a range of representative values for each of a plurality of cell data portions corresponding to a second region of the specific image, wherein a column of cell data values is simultaneously compared with the cell data portions of said specific image to determine if any column of cell data portions matches with said column of cell data values, wherein at least an adjacent pair of cell data values of aid input image returns an overall maximum determination result for an optimal rotation position of said plurality of cell data portions of said specific image, and wherein the discrimination is performed by compensating a minute aberration between the first region of the input image and the second region of the specific image.

* * * * *

UNITED STATES PATENT AND TRADEMARK OFFICE
CERTIFICATE OF CORRECTION

PATENT NO.    : 6,002,800
DATED         : December 14, 1999
INVENTOR(S)   : Ross Alexander Donelly et al.

It is certified that error appears in the above-identified patent and that said Letters Patent is hereby corrected as shown below:

Column 1,
Line 42, "form" should read -- from --;
Line 52, should read as follows:
-- (ii) cell converter means for forming cell data portions from overlapping regions of said pixel stream, said cell data portions being divided into a series of phases with each of said phases having cell data portions derived from non-overlapping regions, --; and
Lines 53 and 54 should be deleted.

Column 2,
Line 27, "temrination" should read -- determination --.

Column 5,
Line 45, "template" should read -- templates --; and
Line 46, "s" should be deleted.

Column 7,
Line 66, "for" should read -- For --.

Column 12,
Line 4, "form" should read -- from --.

Column 14,
Line 39, "but" should read -- bus --.

Column 16,
Line 18, "198" should read -- 298 --;
Line 24, "fi" should read -- if --;
Line 43, "wills tore" should read -- will store --;
Lines 49 and 62, "form" should read -- from --.

Column 17,
Line 20, "wait on detect ! = 0);" should read -- wait on (detect ! = 0); --;
Line 22, "next addr = TMQ (write addr) & Oxff;" should read -- next_addr = TMQ (write_addr) & Oxff; --.

Column 18,
Line 9, "if (Q. first = = 1 && y loc > Q.y pos+3 && valid (Q.t id) ) {" should read -- if (Q.first = = 1 && y loc > Q.y pos+3 && valid (Q.t_id) ) { --.

UNITED STATES PATENT AND TRADEMARK OFFICE
CERTIFICATE OF CORRECTION

PATENT NO.   : 6,002,800
DATED        : December 14, 1999
INVENTOR(S)  : Ross Alexander Donelly et al.

It is certified that error appears in the above-identified patent and that said Letters Patent is hereby corrected as shown below:

Column 20,
Line 31, "latches" should read -- latch --.

Column 21,
Line 13, "x = scan line length" should read -- s = scan line length --.

Column 23,
Line 50, "form" should read -- from --.

Column 25,
Line 60, "form" should read -- from --.

Column 28,
Line 10, "aid" should read -- said --.

Signed and Sealed this

Fifth Day of March, 2002

Attest:

JAMES E. ROGAN
*Attesting Officer*    *Director of the United States Patent and Trademark Office*